(12) United States Patent
Nozue et al.

(10) Patent No.: US 8,871,885 B2
(45) Date of Patent: Oct. 28, 2014

(54) ETHYLENE-Α-OLEFIN COPOLYMER AND MOLDED ARTICLE

(75) Inventors: Yoshinobu Nozue, Ichihara (JP); Naoko Ochi, Chiba (JP); Yasutoyo Kawashima, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 318 days.

(21) Appl. No.: 12/744,857

(22) PCT Filed: Nov. 27, 2008

(86) PCT No.: PCT/JP2008/072002
§ 371 (c)(1),
(2), (4) Date: Jul. 19, 2010

(87) PCT Pub. No.: WO2009/069825
PCT Pub. Date: Jun. 4, 2009

(65) Prior Publication Data
US 2010/0305292 A1 Dec. 2, 2010

(30) Foreign Application Priority Data

Nov. 30, 2007 (JP) ................. 2007-310080

(51) Int. Cl.
*C08F 210/00* (2006.01)
*C08F 210/16* (2006.01)
*C08F 4/659* (2006.01)
*C08F 4/6592* (2006.01)

(52) U.S. Cl.
CPC ........... *C08F 210/16* (2013.01); *C08F 2410/01* (2013.01); *C08F 4/65912* (2013.01); *C08F 4/65927* (2013.01); *C08F 4/65916* (2013.01)

USPC ........................................... 526/348

(58) Field of Classification Search
CPC ...... C08F 10/16; C08F 10/14; C08F 2500/12; C08F 2500/20
USPC ................. 526/348, 348.2–348.6, 352.2, 396
See application file for complete search history.

(56) References Cited

U.S. PATENT DOCUMENTS

| 5,962,615 | A | 10/1999 | Kojoh et al. | |
| 7,335,715 | B2 * | 2/2008 | Iseki et al. | 526/348 |
| 2002/0143124 | A1 | 10/2002 | Ogane | |
| 2003/0060579 | A1 | 3/2003 | Oshima et al. | |
| 2007/0093627 | A1 * | 4/2007 | Iseki et al. | 526/348 |
| 2008/0146761 | A1 * | 6/2008 | Kawashima et al. | 526/348.5 |

FOREIGN PATENT DOCUMENTS

| JP | 07-238114 A | 9/1995 |
| JP | 08-059706 A | 3/1996 |
| JP | 2003-096125 A | 4/2003 |
| JP | 2003-171412 A | 6/2003 |
| JP | 2005-206777 A | 8/2005 |

\* cited by examiner

*Primary Examiner* — Monique Peets
(74) *Attorney, Agent, or Firm* — Sughrue Mion, PLLC

(57) ABSTRACT

An ethylene-α-olefin copolymer wherein the copolymer has a monomer unit based on ethylene and a monomer unit based on an α-olefin having 3 to 20 carbon atoms, the density (d) is 860 to 950 kg/m$^3$, the melt flow rate (MFR) is 1 to 100 g/10 min, the ratio (Mw/Mn) of the weight average molecular weight (Mw) to the number average molecular weight (Mn) is 4 to 30, the ratio (Mz/Mw) of the Z average molecular weight (Mz) to the weight average molecular weight (Mw) is 2 to 5, the swell ratio (SR) is 1.8 or more, and the characteristic relaxation time ($\tau$) obtained by linear viscoelasticity measurement is 0.01 to 10 seconds.

4 Claims, No Drawings

ETHYLENE-A-OLEFIN COPOLYMER AND MOLDED ARTICLE

CROSS REFERENCE TO RELATED APPLICATIONS

This application is a National Stage of International Application No. PCT/JP2008/072002 filed Nov. 27, 2008, claiming priority based on Japanese Patent Application No. 2007-310080 filed Nov. 30, 2007, the contents of all of which are incorporated herein by reference in their entirety.

TECHNICAL FIELD

The present invention relates to an ethylene-α-olefin copolymer and a molded article obtained by extrusion molding of the ethylene-α-olefin copolymer.

BACKGROUND ART

Ethylene-α-olefin copolymers are molded into a film, sheet, bottle or the like by various molding methods, and subjected to various applications such as a food packaging material and the like.

Among ethylene-α-olefin copolymers, copolymers polymerized using a metallocene catalyst are known to have excellent mechanical strengths such as impact strength, tensile strength and the like. Thus, these copolymers have been investigated to be utilized in various applications since weight reduction and cost reduction of a molded article can be expected while maintaining mechanical strengths, by rendering the molded article thinner. However, an ethylene-α-olefin copolymer polymerized using a conventional metallocene catalyst shows high extrusion load in extrusion processing, and manifests small melt tension and swell ratio, thus, molding processability thereof is not sufficient and its utilization is limited.

In contrast, recently, a novel metallocene catalyst has been investigated, and an ethylene-α-olefin copolymer having improved molding processability polymerized using this catalyst has been suggested. For example, JP-A No. 2003-96125 describes an ethylene-α-olefin copolymer polymerized using a metallocene catalyst composed of a transition metal compound having a ligand prepared by connecting of two groups having a cyclopentadiene type anion skeleton via a crosslinking group, a transition metal compound having two groups having a substituted cyclopentadiene type anion skeleton not mutually connected, and a cocatalyst component for activation. JP-A No. 2004-149761 describes an ethylene-α-olefin copolymer polymerized using a metallocene catalyst composed of racemic-ethylenebis(1-indenyl)zirconium diphenoxide; triisobutylaluminum; and a cocatalyst component prepared by contacting of silica, hexamethyldisilazane, diethylzinc, pentafluorophenol and water. JP-A No. 2006-233206 describes an ethylene-α-olefin copolymer polymerized using a metallocene catalyst combining a transition metal compound having a ligand prepared by connecting of two groups having a cyclopentadiene type anion skeleton via a crosslinking group with a transition metal compound having a ligand prepared by connecting a group having a cyclopentadiene type anion skeleton and a group having a fluorenyl type anion skeleton via a crosslinking group; and a carrier prepared by supporting methylalumoxane as a cocatalyst on porous silica.

However, the ethylene-α-olefin copolymers described in JP-A No. 2003-96125 and JP-A No. 2004-149761 are not yet sufficiently satisfactory in extrusion load and swell ratio in molding processing, and the ethylene-α-olefin copolymer described in JP-A No. 2006-233206 has still insufficient swell ratio, and additionally, the molten ethylene-α-olefin copolymer molecular chain has a long relaxation time, thus, the appearance of a molded article obtained by molding and the taking-up property in molding are not yet sufficiently satisfactory.

DISCLOSURE OF THE INVENTION

Under such states, a problem to be solved by the present invention is to provide an ethylene-α-olefin copolymer excellent in extrusion load, swell ratio and mechanical strength, and showing a sufficiently short relaxation time of the molecular chain in molten condition, and a molded article obtained by extrusion molding of this copolymer. The present inventors have intensively studied to solve the problem, leading resultantly to completion of the present invention.

The present invention relates, in a first aspect, to an ethylene-α-olefin copolymer wherein the copolymer has a monomer unit based on ethylene and a monomer unit based on an α-olefin having 3 to 20 carbon atoms, the density (d) is 860 to 950 kg/m$^3$, the melt flow rate (MFR) is 1 to 100 g/10 min, the ratio (Mw/Mn) of the weight average molecular weight (Mw) to the number average molecular weight (Mn) is 4 to 30, the ratio (Mz/Mw) of the Z average molecular weight (Mz) to the weight average molecular weight (Mw) is 2 to 5, the swell ratio (SR) is 1.8 or more, and the characteristic relaxation time (τ) obtained by linear viscoelasticity measurement is 0.01 to 10 seconds.

The present invention relates, in a second aspect, to a molded article obtained by extrusion molding of the above-described ethylene-α-olefin copolymer.

EMBODIMENTS FOR CARRYING OUT THE INVENTION

The ethylene-α-olefin copolymer of the present invention is an ethylene-α-olefin copolymer containing a monomer unit based on ethylene and a monomer unit based on an α-olefin having 3 to 20 carbon atoms. The α-olefin includes propylene, 1-butene, 1-pentene, 1-hexene, 1-heptene, 1-octene, 1-nonene, 1-decene, 1-dodecene, 4-methyl-1-pentene, 4-methyl-1-hexene and the like, and these may be used singly or in combination of two or more. The α-olefin includes preferably 1-butene, 1-hexene, 4-methyl-1-pentene and 1-octene.

The ethylene-α-olefin copolymer of the present invention may also contain a monomer unit based on other monomer in a range not deteriorating the effect of the present invention, in addition to the above-described monomer unit based on ethylene and the above-described monomer unit based on an α-olefin having 3 to 20 carbon atoms. Examples of the other monomer include conjugated dienes (for example, butadiene and isoprene), non-conjugated dienes (for example, 1,4-pentadiene), acrylic acid, acrylates (for example, methyl acrylate and ethyl acrylate), methacrylic acid, methacrylates (for example, methyl methacrylate and ethyl methacrylate), vinyl acetate and the like.

The content of the monomer unit based on ethylene in the ethylene-α-olefin copolymer of the present invention is usually 50 to 99.5% by weight with respect to the total weight (100% by weight) of the ethylene-α-olefin copolymer. The content of the monomer unit based on an α-olefin is usually 0.5 to 50% by weight with respect to the total weight (100% by weight) of the ethylene-α-olefin copolymer.

The ethylene-α-olefin copolymer of the present invention is preferably a copolymer having a monomer unit based on ethylene and a monomer unit based on an α-olefin having 4 to 20 carbon atoms, more preferably a copolymer having a monomer unit based on ethylene and a monomer unit based on an α-olefin having 5 to 20 carbon atoms, and further preferably a copolymer having a monomer unit based on ethylene and a monomer unit based on an α-olefin having 6 to 8 carbon atoms.

Examples of the ethylene-α-olefin copolymer of the present invention include an ethylene-1-butene copolymer, ethylene-1-hexene copolymer, ethylene-4-methyl-1-pentene copolymer, ethylene-1-octene copolymer, ethylene-1-butene-1-hexene copolymer, ethylene-1-butene-4-methyl-1-pentene copolymer, ethylene-1-butene-1-octene copolymer, ethylene-1-hexene-1-octene copolymer and the like, preferably an ethylene-1-hexene copolymer, ethylene-4-methyl-1-pentene copolymer, ethylene-1-butene-1-hexene copolymer, ethylene-1-butene-1-octene copolymer and ethylene-1-hexene-1-octene copolymer.

The density of the ethylene-α-olefin copolymer of the present invention (hereinafter, referred to as "d" in some cases) is 860 to 950 kg/m$^3$. From the standpoint of enhancing the mechanical strength of the resultant molded article, the density is preferably 940 kg/m$^3$ or less, more preferably 935 kg/m$^3$ or less, and further preferably 930 kg/m$^3$ or less. From the standpoint of enhancing the rigidity of the resultant molded article, the density is preferably 870 kg/m$^3$ or more, more preferably 880 kg/m$^3$ or more, further preferably 890 kg/m$^3$ or more, and particularly preferably 900 kg/m$^3$ or more. The density is measured according a method defined in method A in JIS K7112-1980, after performing annealing described in JIS K6760-1995. The density of the ethylene-α-olefin copolymer can be altered by the content of the monomer unit based on ethylene in the ethylene-α-olefin copolymer.

The melt flow rate of the ethylene-α-olefin copolymer of the present invention (hereinafter, referred to as "MFR" in some cases) is usually 1 to 100 g/10 min. The melt flow rate is preferably 1.5 g/10 min or more, from the standpoint of reducing the extrusion load in molding processing. From the standpoint of increasing the mechanical strength of the resultant molded article, the melt flow rate is preferably 50 g/10 min or less, more preferably 20 g/10 min or less, and preferably 10 g/10 min or less. The melt flow rate is a value measured by method A under conditions of a temperature of 190° C. and a load of 21.18 N in a method defined in JIS K7210-1995. The melt flow rate of the ethylene-α-olefin copolymer can be altered, for example, by the hydrogen concentration or polymerization temperature in a production method to be described later, and when the hydrogen concentration or polymerization temperature is raised, the melt flow rate of the ethylene-α-olefin copolymer increases.

The ratio (hereinafter, referred to as "Mw/Mn" in some cases) of the weight average molecular weight (hereinafter, referred to as "Mw" in some cases) to the number average molecular weight (hereinafter, referred to as "Mn" in some cases) is 4 to 30, and the ratio (hereinafter, referred to as "Mz/Mw" in some cases) of the Z average molecular weight (hereinafter, referred to as "Mz" in some cases) to the weight average molecular weight (Mw) is 2 to 5, in the ethylene-α-olefin copolymer of the present invention. When Mw/Mn is too small, the extrusion load in molding processing becomes higher in some cases. Mw/Mn is preferably 4.5 or more, more preferably 5.5 or more, and further preferably 6 or more. When Mz/Mw is too large, the relaxation time of a molecular chain of a polymer in molten condition becomes longer in some cases. Mz/Mw is preferably 4.5 or less, more preferably 4 or less. When Mw/Mn is too large or when Mz/Mw is too small, the mechanical strength of the resultant molded article becomes lower in some cases. Mw/Mn is preferably 25 or less, more preferably 20 or less, further preferably 15 or less, and particularly preferably 12 or less. Mz/Mw is preferably 2.5 or more. The Mw/Mn and the Mz/Mw are obtained by measuring the number average molecular weight (Mn), the weight average molecular weight (Mw) and the Z average molecular weight (Mz) by a gel permeation chromatograph (GPC) method and dividing Mw by Mn and dividing Mz by Mw. The Mw/Mn can be altered, for example, by the hydrogen concentration or polymerization temperature in a production method to be described later, and when the hydrogen concentration or polymerization temperature is raised, the Mw/Mn of the ethylene-α-olefin copolymer increases. The Mz/Mw can be altered, for example, by the use ratio of a transition metal compound (A1) and a transition metal compound (A2) in a production method to be described later, and when the use ratio of a transition metal compound (A2) is lowered, the Mz/Mw of the ethylene-α-olefin copolymer becomes smaller.

Mz/Mw represents the molecular weight distribution of higher molecular weight components, and smaller Mz/Mw as compared with Mw/Mn means that the molecular weight distribution of higher molecular weight components is narrow and the ratio of very higher molecular weight components, that is, the ratio of components showing a very long relaxation time is small, and larger Mz/Mw as compared with Mw/Mn means that the molecular weight distribution of higher molecular weight components is wide and the ratio of very higher molecular weight components, that is, the ratio of components showing a very long relaxation time is high. From the standpoint of reducing the extrusion load and from the standpoint of shortening the relaxation time, (Mw/Mn)–(Mz/Mw) is preferably 1 or more, and more preferably, (Mw/Mn)–(Mz/Mw) is 2 or more. (Mw/Mn)–(Mz/Mw) can be altered, for example, by the use ratio of a transition metal compound (A1) and a transition metal compound (A2), and when the use ratio of a transition metal compound (A2) is increased, (Mw/Mn)–(Mz/Mw) of the ethylene-α-olefin copolymer becomes larger. (Mw/Mn)–(Mz/Mw) can be increased also by performing prepolymerization.

The swell ratio (hereinafter, referred to as "SR" in some cases) of the ethylene-α-olefin copolymer of the present invention is 1.8 or more. When the swell ratio is too small, neck-in becomes larger in flat die film molding, in some cases. The swell ratio is preferably 1.85 or more, more preferably 1.9 or more, and further preferably 2.0 or more. The swell ratio is preferably 2.5 or less, from the standpoint of enhancing the taking-up property in extrusion molding. A strand of an ethylene-α-olefin copolymer extruded with a length of about 15 to 20 mm from an orifice under conditions of a temperature of 190° C. and a load of 21.18 N, in measuring the melt flow rate (MFR), is cooled in air, and the diameter D (unit: mm) of the resultant solid strand is measured at a position about 5 mm from the end at the extrusion upstream side and the diameter D is divided by the orifice diameter: 2.095 mm ($D_0$), to give the value of the swell ratio. The swell ratio can be altered, for example, by the hydrogen concentration and the ethylene pressure or the electron donating compound concentration, in polymerization, in a production method to be described later, and when the hydrogen concentration is raised and the ethylene pressure is lowered, the swell ratio of the ethylene-α-olefin copolymer increases. In addition, the swell ratio can be controlled by performing prepolymerization in polymerization, and the like.

The number of branches having 5 or more carbon atoms (hereinafter, referred to as "$N_{LCB}$" in some cases) of the ethylene-α-olefin copolymer of the present invention is preferably 0.1/1000 C or more, more preferably 0.12/1000 C or more, from the standpoint of further reducing the extrusion load in molding processing. From the standpoint of enhancing the mechanical strength of the resultant molded article, it is preferably 1/1000 C or less, more preferably 0.7/1000 C or less. The $N_{LCB}$ can be altered, for example, by the concentration of an electron donating compound or the use ratio of a transition metal compound (A1) and a transition metal compound (A2), in a production method to be described later. The $N_{LCB}$ can be controlled also by performing prepolymerization.

$N_{LCB}$ is obtained by calculating the area of a peak derived from a methine carbon to which branches having 5 or more carbon atoms are connected, from a $^{13}$C-NMR spectrum measured by a carbon nuclear magnetic resonance ($^{13}$C-NMR) method, the sum of the areas of all peaks observed between 5 to 50 ppm being 1000. A peak derived from a methine carbon to which branches having 7 or more carbon atoms are connected is observed around 38.2 ppm (see: academic literature "Macromolecules", (USA), American Chemical Society, 1999, vol. 32, p. 3817-3819). Since the position of the peak derived from a methine carbon to which branches having 5 or more carbon atoms are connected shifts depending on a measuring apparatus and measuring conditions, the position is usually determined by measuring a sample for every measuring apparatus and measuring conditions. For spectrum analysis, it is preferable to use a negative exponential function as a window function.

The characteristic relaxation time (hereinafter, referred to as "τ" in some cases) of the ethylene-α-olefin copolymer of the present invention is 0.01 to 10 seconds, from the standpoint of enhancing the taking-up property in molding and the appearance of a molded article. The characteristic relaxation time is a numerical value showing the length of a long chain branch in the ethylene-α-olefin copolymer, and when the long chain branch is shorter, the characteristic relaxation time is a smaller value and when the long chain branch is longer, the characteristic relaxation time is a larger value. The characteristic relaxation time is preferably 0.1 second or more. The characteristic relaxation time is preferably 5 seconds or less. The characteristic relaxation time can be altered, for example, by polymerization conditions such as the hydrogen concentration, ethylene pressure and the like, and the use ratio of a transition metal compound (A1) and a transition metal compound (A2), and the characteristic relaxation time of the ethylene-α-olefin copolymer can be made shorter by decreasing the use ratio of a transition metal compound (A2).

The characteristic relaxation time is a numerical value calculated from a master curve showing the dependency of the melt complex viscosity (unit: Pa·sec) at 190° C. on the angular frequency (unit: rad/sec), made based on the time-temperature superposition principle. Specifically, melt complex viscosity-angular frequency curves (unit of melt complex viscosity is Pa·sec, unit of angular frequency is rad/sec) of the ethylene-α-olefin copolymer at respective temperatures (T, unit: ° C.) of 130° C., 150° C., 170° C. and 190° C. are superposed on a melt complex viscosity-angular frequency curve at 190° C. to make a master curve, based on the time-temperature superposition principle, and the resultant master curve is approximated according to the following formula (I), to give a calculated value of the characteristic relaxation time.

$$\eta = \eta_0/[1+(\tau \times \omega)^n] \quad (I)$$

η: melt complex viscosity (unit: Pa·sec)
ω: angular frequency (unit: rad/sec)
τ: characteristic relaxation time (unit: sec)
$\eta_0$: constant determined for every ethylene-α-olefin copolymer (unit: Pa·sec)
n: constant determined for every ethylene-α-olefin copolymer For the above-described calculation, a commercially available calculation software may be used, and the calculation software includes Rhios V.4.4.4 available from Rheometrics, and the like.

Measurement of a melt complex viscosity-angular frequency curve is carried out using a viscoelasticity measuring apparatus (for example, Rheometrics Mechanical Spectrometer RMS-800 manufactured by Rheometrics, and the like), usually under conditions of geometry: parallel plate, plate diameter: 25 mm, plate interval: 1.5 to 2 mm, strain: 5% and angular frequency: 0.1 to 100 rad/second. The measurement is carried out under a nitrogen atmosphere, and it is preferable to previously compound a suitable amount (for example, 1000 ppm) of an antioxidant into a measurement sample.

It is preferable that g* defined by the following formula (II) of the ethylene-α-olefin copolymer of the present invention is 0.76 to 0.95 (see the following literature for g*: Developments in Polymer Characterisation-4, J. V. Dawkins, Ed., Applied Science, London, 1983, Chapter. I, "Characterization. of. Long Chain Branching in Polymers," written by Th. G. Scholte).

$$g^* = [\eta]/([\eta]_{GPC} \times g_{SCB}^*) \quad (II)$$

[wherein, [η]] represents the limiting viscosity (unit: dl/g) of the ethylene-α-olefin copolymer, and defined by the following formula (II-I). It shall be defined by the following formula (II-II). $g_{SCB}^*$ is defined by the following formula (II-III).

$$[\eta] = 23.3 \times \log(\eta\text{rel}) \quad (II\text{-}I)$$

(wherein, ηrel represents relative viscosity of the ethylene-α-olefin copolymer)

$$[\eta]_{GPC} = 0.00046 \times Mv^{0.725} \quad (II\text{-}II)$$

(wherein, Mv represents the viscosity average molecular weight of the ethylene-α-olefin copolymer)

$$g_{SCB}^* (1-A)^{1.725} \quad (II\text{-}III)$$

(wherein, A can be determined directly by measurement of the content of short chain branches in the ethylene-α-olefin copolymer)].

$[\eta]_{GPC}$ represents the limiting viscosity (unit: dl/g) of a polymer which is hypothesized to have the same molecular weight distribution as that of the ethylene-α-olefin copolymer and to have a linear molecular chain.

$g_{SCB}^*$ represents contribution to g* generated by introduction of short chain branches into the ethylene-α-olefin copolymer.

As the formula (II-II), a formula described in L. H. Tung, Journal of Polymer Science, 36, 130 (1959) p. 287-294 is used.

For the relative viscosity (ηrel) of the ethylene-α-olefin copolymer, 100 mg of an olefin polymer is dissolved at 135° C. in 100 ml of tetralin containing 0.5% by weight of butylhydroxytoluene (BHT) as a thermal degradation inhibitor to prepare a sample solution, and the relative viscosity is calculated from the fall time of the above-described sample solution and the fall time of a blank solution composed of tetralin containing only 0.5% by weight of BHT as a thermal degradation inhibitor obtained by using a Ubbelohde type viscometer.

The viscosity average molecular weight (Mv) of the ethylene-α-olefin copolymer is defined by the following formula (II-IV):

$$M_V = \left( \frac{\sum_{\mu=1}^{\infty} M_\mu^{a+1} n_\mu}{\sum_{\mu=1}^{\infty} M_\mu n_\mu} \right)^{\frac{1}{a}} \quad \text{(II-IV)}$$

wherein a=0.725.

A in the formula (II-III) is estimated as A=((12×n+2n+1)×y)/((1000−2y−2)×14+(y+2)×15+y×13) wherein the number of branch carbons in short chain branches is represented by n (for example, n=2 in the case of use of butene as an α-olefin, n=4 in the case of use of hexene as an α-olefin) and the number of short chain branches per 1000 carbon atoms measured by NMR or infrared spectrometry is represented by y.

g* is an index representing the degree of shrinkage of molecules in a solution ascribable to long chain branches, and when the content of long chain branches per molecular chain is large, shrinkage of the molecular chain increases and g* decreases. g* of the ethylene-α-olefin copolymer is preferably 0.95 or less, more preferably 0.85 or less, from the standpoint of decreasing extrusion load. When g* is large, extrusion load cannot be decreased sufficiently since long chain branches are not contained sufficiently. g* of the ethylene-α-olefin copolymer is preferably 0.76 or more from the standpoint of improvement in mechanical strength and shortening of the relaxation time. When g* is too small, spreading of molecular chains when a crystal is formed is too small, thus, the generation probability of a tie molecule lowers, strength decreases, and in addition, due to a long chain branched structure, the relaxation time of a molecular chain becomes too long, and the appearance of a molded article deteriorates. g* can be controlled, for example, by performing prepolymerization.

The flow activation energy (hereinafter, referred to as "Ea" in some cases) of the ethylene-α-olefin copolymer of the present invention is preferably 50 kJ/mol or more, more preferably 60 kJ/mol or more, from the standpoint of further reducing the extrusion load in molding processing. The flow activation energy is preferably 150 kJ/mol or less, more preferably 130 kJ/mol or less, further preferably 110 kJ/mol or less, and most preferably 100 kJ/mol, from the standpoint of enhancing the taking-up property in extrusion molding. The flow activation energy can be altered, for example, by the use ratio of a transition metal compound (A1) and a transition metal compound (A2) in a production method to be described later, and when the use ratio of a transition metal compound (A2) is enhanced, Ea of the ethylene-α-olefin copolymer increases.

The flow activation energy (Ea) is a numerical value calculated according to an Arrhenius type equation from a shift factor ($a_T$) in making a master curve showing the dependency of melt complex viscosity (unit: Pa·sec) at 190° C. on angular frequency (unit: rad/sec), based on the time-temperature superposition principle, and is a value obtained by a method described below. That is, melt complex viscosity-angular frequency curves (unit of melt complex viscosity is Pa·sec, unit of angular frequency is rad/sec) of the ethylene-α-olefin copolymer at respective temperatures (T, unit: ° C.) of 130° C., 150° C., 170° C. and 190° C. are superposed on a melt complex viscosity-angular frequency curve of the ethylenic copolymer at 190° C., for each melt complex viscosity-angular frequency curve at each temperature (T), based on the time-temperature superposition theory, thereby obtaining shift factors ($a_T$) at respective temperatures (T), and a primary approximation formula (the following formula (III)) of [ln ($a_T$)] and [1/(T+273.16)] is calculated by a least square method from respective temperatures (T) and shift factors ($a_T$) at respective temperatures (T). Then, Ea is obtained from the inclination m of the primary formula and the following formula (IV).

$$\ln(a_T) = m(1/(T+273.16)) + n \quad \text{(III)}$$

$$Ea = |0.008314 \times m| \quad \text{(IV)}$$

$a_T$: shift factor
Ea: flow activation energy (unit: kJ/mol)
T: temperature (unit: ° C.)

In the above-described calculation, a commercially available calculation software may be used, and the commercially available calculation software includes Rhios V.4.4.4 available from Rheometrics, and the like.

The shift factor ($a_T$) is move amount when melt complex viscosity-angular frequency double logarithm curves at respective temperatures (T) are moved to the log(Y)=−log(X) axis direction (here, Y axis represents melt complex viscosity, X axis represents angular frequency) and superposed on a melt complex viscosity-angular frequency curve at 190° C., and in this superposition, for the melt complex viscosity-angular frequency double logarithm curves at respective temperatures (T), the angular frequency is moved by $a_T$-fold and the melt complex viscosity is moved by 1/$a_T$-fold, for each curve. The correlation coefficient in obtaining the formula (I) by a least square method from values at four points of 130° C., 150° C., 170° C. and 190° C. is usually 0.99 or more.

Measurement of the melt complex viscosity-angular frequency curve is carried out using a viscoelasticity measuring apparatus (for example, Rheometrics Mechanical Spectrometer RMS-800 manufactured by Rheometrics, and the like), usually under conditions of geometry: parallel plate, plate diameter: 25 mm, plate interval: 1.5 to 2 mm, strain: 5% and angular frequency: 0.1 to 100 rad/second. The measurement is carried out under a nitrogen atmosphere, and it is preferable to previously compound a suitable amount (for example, 1000 ppm) of an antioxidant into a measurement sample.

As the method of producing the ethylene-α-olefin copolymer of the present invention, there is mentioned a method of copolymerizing ethylene and an α-olefin having 3 to 20 carbon atoms in the presence of a polymerization catalyst formed by contacting a transition metal compound (A1) of the following general formula (1), a transition metal compound (A2) of the following general formula (3) and a cocatalyst component (B) described later, the transition metal compound (A1) and the transition metal compound (A2) are being brought into contact at a molar ratio ((A1)/(A2)) of 1 to 30. (A1)/(A2) is preferably 5 or more, more preferably 10 or more, from the standpoint of shortening the relaxation time of a molecular chain of the ethylene-α-olefin copolymer in molten state and enhancing mechanical strength. (A1)/(A2) is preferably 20 or less, from the standpoint of enhancing SR.

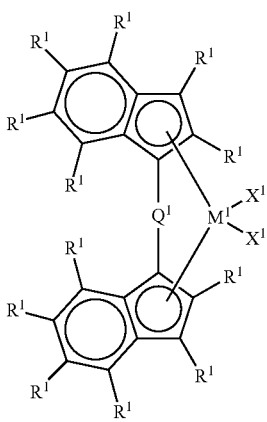

(1)

[wherein, $M^1$ represents a group IV transition metal atom in the periodic table of the elements, $X^1$ and $R^1$ represent each independently a hydrogen atom, a halogen atom, an optionally substituted hydrocarbyl group having 1 to 20 carbon atoms, an optionally substituted hydrocarbyloxy group having 1 to 20 carbon atoms, a substituted silyl group having 1 to 20 carbon atoms or a substituted amino group having 1 to 20 carbon atoms, and a plurality of $X^1$ may be mutually the same or different, a plurality of $R^1$ may be mutually the same or different, and $Q^1$ represents a crosslinking group of the following general formula (2).

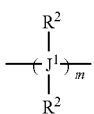

(2)

(wherein, m represents an integer of 1 to 5, $J^1$ represents a group XIV atom in the periodic table of the elements, $R^2$ represents a hydrogen atom, a halogen atom, an optionally substituted hydrocarbyl group having 1 to 20 carbon atoms, an optionally substituted hydrocarbyloxy group having 1 to 20 carbon atoms, a substituted silyl group having 1 to 20 carbon atoms or a substituted amino group having 1 to 20 carbon atoms, and a plurality of $R^2$ may be mutually the same or different)].

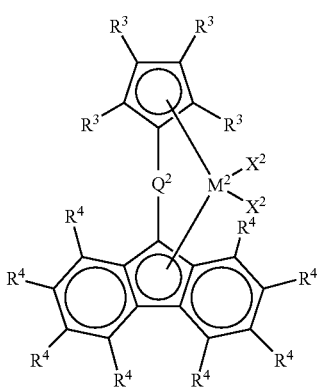

(3)

[wherein, $M^2$ represents a group IV transition metal atom in the periodic table of the elements, $X^2$, $R^3$ and $R^4$ represent each independently a hydrogen atom, a halogen atom, an optionally substituted hydrocarbyl group having 1 to 20 carbon atoms, an optionally substituted hydrocarbyloxy group having 1 to 20 carbon atoms, a substituted silyl group having 1 to 20 carbon atoms or a substituted amino group having 1 to 20 carbon atoms, and a plurality of $X^2$ may be mutually the same or different, a plurality of $R^3$ may be mutually the same or different, a plurality of $R^4$ may be mutually the same or different, and $Q^2$ represents a crosslinking group of the following general formula (4):

(4)

(wherein, n represents an integer of 1 to 5, $J^2$ represents a group XIV atom in the periodic table of the elements, $R^5$ represents a hydrogen atom, a halogen atom, an optionally substituted hydrocarbyl group having 1 to 20 carbon atoms, an optionally substituted hydrocarbyloxy group having 1 to 20 carbon atoms, a substituted silyl group having 1 to 20 carbon atoms or a substituted amino group having 1 to 20 carbon atoms, and a plurality of $R^5$ may be mutually the same or different)].

$M^1$ in the general formula (1) and $M^2$ in the general formula (3) represent a group IV transition metal atom in the periodic table of the elements, and examples thereof include a titanium atom, zirconium atom, hafnium atom and the like.

$X^1$, $R^1$ in the general formula (1) and $X^2$, $R^3$, $R^4$ in the general formula (3) represent each independently a hydrogen atom, a halogen atom, an optionally substituted hydrocarbyl group having 1 to 20 carbon atoms, an optionally substituted hydrocarbyloxy group having 1 to 20 carbon atoms, a substituted silyl group having 1 to 20 carbon atoms or a substituted amino group having 1 to 20 carbon atoms, and a plurality of $X^1$ may be mutually the same or different, a plurality of $R^1$ may be mutually the same or different, a plurality of $X^2$ may be mutually the same or different, a plurality of $R^3$ may be mutually the same or different, and a plurality of $R^4$ may be mutually the same or different.

The halogen atom represented by $X^1$, $R^1$, $X^2$, $R^3$ and $R^4$ includes a fluorine atom, chlorine atom, bromine atom, iodine atom and the like.

The optionally substituted hydrocarbyl group having 1 to 20 carbon atoms represented by $X^1$, $R^1$, $X^2$, $R^3$ and $R^4$ includes an alkyl group having 1 to 20 carbon atoms, a halogenated alkyl group having 1 to 20 carbon atoms, an aralkyl group having 7 to 20 carbon atoms, an aryl groups having 6 to 20 carbon atoms, and the like.

Examples of the alkyl group having 1 to 20 carbon atoms include a methyl group, ethyl group, n-propyl group, isopropyl group, n-butyl group, sec-butyl group, tert-butyl group, n-pentyl group, neopentyl group, isopentyl group, n-hexyl group, n-heptyl group, n-octyl group, n-decyl group, n-nonyl group, n-decyl group, n-dodecyl group, n-dodecyl group, n-tridecyl group, n-tetradecyl group, n-pentadecyl group, n-hexadecyl group, n-heptadecyl group, n-octadecyl group, n-nonadecyl group, n-eicosyl group and the like.

Examples of the halogenated alkyl group having 1 to 20 carbon atoms include a fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group and the like.

Examples of the aralkyl group having 7 to 20 carbon atoms include a benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (4,6-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-decylphenyl)methyl group, (n-tetradecylphenyl)methyl group, naphthylmethyl group, anthracenylmethyl group, phenylethyl group, phenylpropyl group, phenylbutyl group, diphenylmethyl group, diphenylethyl group, diphenylpropyl group, diphenylbutyl group and the like. Further mentioned are halogenated aralkyl groups obtained by substitution on these aralkyl groups with a halogen atom such as a fluorine atom, chlorine atom, bromine atom or iodine atom, and the like.

Examples of the aryl group having 6 to 20 carbon atoms include a phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, diethylphenyl group, triethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group and the like. Further mentioned are halogenated aryl groups obtained by substitution on these aryl groups with a halogen atom such as a fluorine atom, chlorine atom, bromine atom or iodine atom, and the like.

The optionally substituted hydrocarbyl group having 1 to 20 carbon atoms includes a hydrocarbyl group substituted with a substituted silyl group, a hydrocarbyl group substituted with a substituted amino group, a hydrocarbyl group substituted with a hydrocarbyloxy group, and the like.

The hydrocarbyl group substituted with a substituted silyl group includes a trimethylsilylmethyl group, trimethylsilylethyl group, trimethylsilylpropyl group, trimethylsilylbutyl group, trimethylsilylphenyl group, bis(trimethylsilyl)methyl group, bis(trimethylsilyl)ethyl group, bis(trimethylsilyl)propyl group, bis(trimethylsilyl)butyl group, bis(trimethylsilyl)phenyl group, triphenylsilylmethyl group and the like.

The hydrocarbyl group substituted with a substituted amino group includes a dimethylaminomethyl group, dimethylaminoethyl group, dimethylaminopropyl group, dimethylaminobutyl group, dimethylaminophenyl group, bis(dimethylamino)methyl group, bis(dimethylamino)ethyl group, bis(dimethylamino)propyl group, bis(dimethylamino)butyl group, bis(dimethylamino)phenyl group, phenylaminomethyl group, diphenylaminomethyl group, diphenylaminophenyl group and the like.

The hydrocarbyl group substituted with a hydrocarbyloxy group includes a methoxymethyl group, ethoxymethyl group, n-propoxymethyl group, isopropoxymethyl group, n-butoxymethyl group, sec-butoxymethyl group, tert-butoxymethyl group, phenoxymethyl group, methoxyethyl group, ethoxyethyl group, n-propoxyethyl group, isopropoxyethyl group, n-butoxyethyl group, sec-butoxyethyl group, tert-butoxyethyl group, phenoxyethyl group, methoxy-n-propyl group, ethoxy-n-propyl group, n-propoxy-n-propyl group, isopropoxy-n-propyl group, n-butoxy-n-propyl group, sec-butoxy-n-propyl group, tert-butoxy-n-propyl group, phenoxy-n-propyl group, methoxyisopropyl group, ethoxyisopropyl group, n-propoxyisopropyl group, isopropoxyisopropyl group, n-butoxyisopropyl group, sec-butoxyisopropyl group, tert-butoxyisopropyl group, phenoxyisopropyl group, methoxyphenyl group, ethoxyphenyl group, n-propoxyphenyl group, isopropoxyphenyl group, n-butoxyphenyl group, sec-butoxyphenyl group, tert-butoxyphenyl group, phenoxyphenyl group and the like.

The optionally substituted hydrocarbyloxy group having 1 to 20 carbon atoms represented by $X^1$, $R^1$, $X^2$, $R^3$ and $R^4$ includes an alkoxy group having 1 to 20 carbon atoms, aralkyloxy group having 7 to 20 carbon atoms, aryloxy group having 6 to 20 carbon atoms, and the like.

Examples of the alkoxy group having 1 to 20 carbon atoms include a methoxy group, ethoxy group, n-propoxy group, isopropoxy group, n-butoxy group, sec-butoxy group, tert-butoxy group, n-pentyloxy group, neopentyloxy group, n-hexyloxy group, n-octyloxy group, n-nonyloxy group, n-decyloxy group, n-undecyloxy group, n-dodecyloxy group, n-tridecyloxy group, n-tetradecyloxy group, n-pentadecyloxy group, n-hexadecyloxy group, n-heptadecyloxy group, n-heptadecyloxy group, n-octadecyloxy group, n-nonadecyloxy group, n-eicosoxy group and the like. Further mentioned are halogenated alkoxy groups obtained by substitution on these alkoxy groups with a halogen atom such as a fluorine atom, chlorine atom, bromine atom or iodine atom, and the like.

Examples of the aralkyloxy group having 7 to 20 carbon atoms include a benzyloxy group, (2-methylphenyl)methoxy group, (3-methylphenyl)methoxy group, (4-methylphenyl)methoxy group, (2,3-dimethylphenyl)methoxy group, (2,4-dimethylphenyl)methoxy group, (2,5-dimethylphenyl)methoxy group, (2,6-dimethylphenyl)methoxygroup, (3,4-dimethylphenyl)methoxy group, (3,5-dimethylphenyl)methoxy group, (2,3,4-trimethylphenyl)methoxy group, (2,3,5-trimethylphenyl)methoxy group, (2,3,6-trimethylphenyl)methoxy group, (2,4,5-trimethylphenyl)methoxy group, (2,4,6-trimethylphenyl)methoxy group, (3,4,5-trimethylphenyl)

methoxy group, (2,3,4,5-tetramethylphenyl)methoxy group, (2,3,4,6-tetramethylphenyl)methoxy group, (2,3,5,6-tetramethylphenyl)methoxy group, (pentamethylphenyl)methoxy group, (ethylphenyl)methoxy group, (n-propylphenyl)methoxy group, (isopropylphenyl)methoxy group, (n-butylphenyl)methoxy group, (sec-butylphenyl)methoxy group, (tert-butylphenyl)methoxy group, (n-hexylphenyl)methoxy group, (n-octylphenyl)methoxy group, (n-decylphenyl)methoxy group, (n-tetradecylphenyl)methoxy group, naphthylmethoxy group, anthracenylmethoxy group and the like. Further mentioned are halogenated aralkyloxy groups obtained by substitution on these aralkyloxy groups with a halogen atom such as a fluorine atom, chlorine atom, bromine atom or iodine atom, and the like.

Examples of the aryloxy group having 6 to 20 carbon atoms include a phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenoxy group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, anthracenoxy group and the like. Further mentioned are halogenated aryloxy groups obtained by substitution on these aryloxy groups with a halogen atom such as a fluorine atom, chlorine atom, bromine atom or iodine atom, and the like.

The substituted silyl group having 1 to 20 carbon atoms represented by $X^1$, $R^1$, $X^2$, $R^3$ and $R^4$ includes silyl groups substituted with a hydrocarbyl group such as an alkyl group, aryl group and the like. Specific examples thereof include mono-substituted silyl groups such as a methylsilyl group, ethylsilyl group, n-propylsilyl group, isopropylsilyl group, n-butylsilyl group, sec-butylsilyl group, tert-butylsilyl group, isobutylsilyl group, n-pentylsilyl group, n-hexylsilyl group, phenylsilyl group and the like; di-substituted silyl groups such as a dimethylsilyl group, diethylsilyl group, di-n-propylsilyl group, diisopropylsilyl group, di-n-butylsilyl group, di-sec-butylsilyl group, di-tert-butylsilyl group, diisobutylsilyl group, diphenylsilyl group and the like; tri-substituted silyl groups such as a trimethylsilyl group, triethylsilyl group, tri-n-propylsilyl group, triisopropylsilyl group, tri-n-butylsilyl group, tri-sec-butylsilyl group, tri-tert-butylsilyl group, triisobutylsilyl group, tert-butyldimethylsilyl group, tri-n-pentylsilyl group, tri-n-hexylsilyl group, tricyclohexylsilyl group, triphenylsilyl group and the like; etc.

Examples of the substituted amino group having 1 to 20 carbon atoms represented by $X^1$, $R^1$, $X^2$, $R^3$ and $R^4$ include amino groups substituted with two hydrocarbyl groups such as an alkyl group, aryl group and the like. Specific examples thereof include a methylamino group, ethylamino group, n-propylamino group, isopropylamino group, n-butylamino group, sec-butylamino group, tert-butylamino group, isobutylamino group, n-hexylamino group, n-octylamino group, n-decylamino group, phenylamino group, benzylamino group, dimethylamino group, diethylamino group, di-n-propylamino group, diisopropylamino group, di-n-butylamino group, di-sec-butylamino group, di-tert-butylamino group, diisobutylamino group, tert-butylisopropylamino group, di-n-hexylamino group, di-n-octylamino group, di-n-decylamino group, diphenylamino group, dibenzylamino group, tert-butylisopropylamino group, phenylethylamino group, phenylpropylamino group, phenylbutylamino group, pyrrolyl group, pyrrolidinyl group, piperidinyl group, carbazolyl group, dihydroisoindolyl group and the like.

$X^1$ represents preferably a chlorine atom, methyl group, ethyl group, n-propyl group, isopropyl group, n-butyl group, methoxy group, ethoxy group, n-propoxy group, isopropoxy group, n-butoxy group, trifluoromethoxy group, phenyl group, phenoxy group, 2,6-di-tert-butylphenoxy group, 3,4,5-trifluorophenoxy group, pentafluorophenoxy group, 2,3,5,6-tetrafluoro-4-pentafluorophenylphenoxy group or benzyl group.

$R^1$ represents preferably a hydrogen atom or alkyl group having 1 to 6 carbon atoms, more preferably a hydrogen atom or alkyl group having 1 to 4 carbon atoms, and further preferably a hydrogen atom.

$X^2$ represents preferably a chlorine atom, methyl group, ethyl group, n-propyl group, isopropyl group, n-butyl group, methoxy group, ethoxy group, n-propoxy group, isopropoxy group, n-butoxy group, trifluoromethoxy group, phenyl group, phenoxy group, 2,6-di-tert-butylphenoxy group, 3,4,5-trifluorophenoxy group, pentafluorophenoxy group, 2,3,5,6-tetrafluoro-4-pentafluorophenylphenoxy group or benzyl group.

$R^3$ represents preferably a hydrogen atom or alkyl group having 1 to 6 carbon atoms, more preferably a hydrogen atom or alkyl group having 1 to 4 carbon atoms, and further preferably a hydrogen atom.

$R^4$ represents preferably a hydrogen atom or alkyl group having 1 to 6 carbon atoms, more preferably a hydrogen atom or alkyl group having 1 to 4 carbon atoms, and further preferably a hydrogen atom.

$Q^1$ in the general formula (1) represents a crosslinking group of the general formula (2), and $Q^2$ in the general formula (3) represents a crosslinking group of the general formula (4).

m in the general formula (2) and n in the general formula (4) represent an integer of 1 to 5. m represents preferably 1 to 2, and n represents preferably 1 to 2.

$J^1$ in the general formula (2) and $J^2$ in the general formula (4) represent a group XIV transition metal atom in the periodic table of the elements, and include a carbon atom, silicon atom, germanium atom and the like. Preferable is a carbon atom or silicon atom.

$R^2$ in the general formula (2) and $R^5$ in the general formula (4) represent each independently a hydrogen atom, a halogen atom, an optionally substituted hydrocarbyl group having 1 to 20 carbon atoms, an optionally substituted hydrocarbyloxy group having 1 to 20 carbon atoms, a substituted silyl group having 1 to 20 carbon atoms or a substituted amino group having 1 to 20 carbon atoms, and a plurality of $R^2$ may be mutually the same or different and a plurality of $R^5$ may be mutually the same or different.

As the halogen atom, optionally substituted hydrocarbyl group having 1 to 20 carbon atoms, optionally substituted hydrocarbyloxy group having 1 to 20 carbon atoms, substituted silyl group having 1 to 20 carbon atoms and substituted amino group having 1 to 20 carbon atoms represented by $R^2$ and $R^5$, there are mentioned those exemplified as the halogen atom, optionally substituted hydrocarbyl group having 1 to 20 carbon atoms, optionally substituted hydrocarbyloxy group having 1 to 20 carbon atoms, substituted silyl group having 1 to 20 carbon atoms and substituted amino group having 1 to 20 carbon atoms represented by $X^1$, $R^1$, $X^2$, $R^3$ and $R^4$.

$Q^1$ and $Q^2$ include a methylene group, ethylidene group, ethylene group, propylidene group, propylene group, butylidene group, butylene group, pentylidene group, pentylene group, hexylidene group, isopropylidene group, methylethylmethylene group, methylpropylmethylene group, methylbutylmethylene group, bis(cyclohexyl)methylene group, methylphenylmethylene group, diphenylmethylene group, phenyl(methylphenyl)methylene group, di(methylphenyl)methylene group, bis(dimethylphenyl)methylene group, bis(trimethylphenyl)methylene group, phenyl(ethylphenyl)methylene group, di(ethylphenyl)methylene group, bis(diethylphenyl)methylene group, phenyl(propylphenyl)methylene group, di(propylphenyl)methylene group, bis(dipropylphenyl)methylene group, phenyl(butylphenyl)methylene group, di(butylphenyl)methylene group, phenyl(naphthyl)methylene group, di(naphthyl)methylene group, phenyl(biphenyl)methylene group, di(biphenyl)methylene group, phenyl(trimethylsilylphenyl)methylene group, bis(trimethylsilylphenyl)methylene group, bis(pentafluorophenyl)methylene group, silanediyl group, disilanediyl group, trisilanediyl group, tetrasilanediyl group, dimethylsilanediyl group, bis(dimethylsilane)diyl group, diethylsilanediyl group, dipropylsilanediyl group, dibutylsilanediyl group, diphenylsilanediyl group, silacyclobutanediyl group, silacyclohexanediyl group, divinylsilanediyl group, diarylsilanediyl group, (methyl)(vinyl)silanediyl group, (aryl)(methyl)silanediyl group and the like.

$Q^1$ represents preferably a methylene group, ethylene group, isopropylidene group, bis(cyclohexyl)methylene group, diphenylmethylene group, dimethylsilanediyl group or bis(dimethylsilane)diyl group, more preferably an ethylene group or dimethylsilanediyl group. $Q^2$ represents preferably a methylene group, ethylene group, isopropylidene group, bis(cyclohexyl)methylene group, diphenylmethylene group, dimethylsilanediyl group or bis(dimethylsilane)diyl group, more preferably a diphenylmethylene group.

As the transition metal compound (A1) of the general formula (1) in which $M^1$ represents a zirconium atom and $X^1$ represents a chlorine atom, exemplified are methylenebis(indenyl)zirconium dichloride, isopropylidenebis(indenyl)zirconium dichloride, (methyl)(phenyl)methylenebis(indenyl)zirconium dichloride, diphenylmethylenebis(indenyl)zirconium dichloride, ethylenebis(indenyl)zirconium dichloride, methylenebis(methylindenyl)zirconium dichloride, isopropylidenebis(methylindenyl)zirconium dichloride, (methyl)(phenyl)methylenebis(methylindenyl)zirconium dichloride, diphenylmethylenebis(methylindenyl)zirconium dichloride, ethylenebis(methylindenyl)zirconium dichloride, methylene(indenyl)(methylindenyl)zirconium dichloride, isopropylidene(indenyl)(methylindenyl)zirconium dichloride, (methyl)(phenyl)methylene(indenyl)(methylindenyl)zirconium dichloride, diphenylmethylene(indenyl)(methylindenyl)zirconium dichloride, ethylene(indenyl)(methylindenyl)zirconium dichloride, methylenebis(2,4-dimethylindenyl)zirconium dichloride, isopropylidenebis(2,4-dimethylindenyl)zirconium dichloride, (methyl)(phenyl)methylenebis(2,4-dimethylindenyl)zirconium dichloride, diphenylmethylenebis(2,4-dimethylindenyl)zirconium dichloride, ethylenebis(2,4-dimethylindenyl)zirconium dichloride, dimethylsilanediylbis(indenyl)zirconium dichloride, diethylsilanediylbis(indenyl)zirconium dichloride, di(n-propyl)silanediylbis(indenyl)zirconium dichloride, diisopropylsilanediylbis(indenyl)zirconium dichloride, dicyclohexylsilanediylbis(indenyl)zirconium dichloride, diphenylsilanediylbis(indenyl)zirconium dichloride, di(p-tolyl)silanediylbis(indenyl)zirconium dichloride, divinylsilanediylbis(indenyl)zirconium dichloride, diarylsilanediylbis(indenyl)zirconium dichloride, (methyl)(vinyl)silanediylbis(indenyl)zirconium dichloride, (aryl)(methyl)silanediylbis(indenyl)zirconium dichloride, (ethyl)(methyl)silanediylbis(indenyl)zirconium dichloride, (methyl)(n-propyl)silanediylbis(indenyl)zirconium dichloride, (methyl)(isopropyl)silanediylbis(indenyl)zirconium dichloride, (cyclohexyl)(methyl)bis(indenyl)zirconium dichloride, (methyl)(phenyl)silanediylbis(indenyl)zirconium dichloride, dimethylsilanediylbis(methylindenyl)zirconium dichloride, diethylsilanediylbis(methylindenyl)zirconium dichloride, di(n-propyl)silanediylbis(methylindenyl)zirconium dichloride, diisopropylsilanediylbis(methylindenyl)zirconium dichloride, dicyclohexylsilanediylbis(methylindenyl)zirconium dichloride, diphenylsilanediylbis(methylindenyl)zirconium dichloride, (ethyl)(methyl)silanediylbis(methylindenyl)zirconium dichloride, (methyl)(n-propyl)silanediylbis(methylindenyl)zirconium dichloride, (methyl)(isopropyl)silanediylbis(methylindenyl)zirconium dichloride, (cyclohexyl)(methyl)bis(methylindenyl)zirconium dichloride, (methyl)(phenyl)silanediylbis(methylindenyl)zirconium dichloride, dimethylsilanediyl(indenyl)(methylindenyl)zirconium dichloride, diethylsilanediyl(indenyl)(methylindenyl)zirconium dichloride, di(n-propyl)silanediyl(indenyl)(methylindenyl)zirconium dichloride, diisopropylsilanediyl(indenyl)(methylindenyl)zirconium dichloride, dicyclohexylsilanediyl(indenyl)(methylindenyl)zirconium dichloride, diphenylsilanediyl(indenyl)(methylindenyl)zirconium dichloride, (ethyl)(methyl)silanediyl(indenyl)(methylindenyl)zirconium dichloride, (methyl)(n-propyl)silanediyl(indenyl)(methylindenyl)zirconium dichloride, (methyl)(isopropyl)silanediyl(indenyl)(methylindenyl)zirconium dichloride, (cyclohexyl)(methyl)(indenyl)(methylindenyl)zirconium dichloride, (methyl)(phenyl)silanediyl(indenyl)(methylindenyl)zirconium dichloride, dimethylsilanediylbis(2,4-dimethylindenyl)zirconium dichloride, diethylsilanediylbis(2,4-dimethylindenyl)zirconium dichloride, di(n-propyl)silanediylbis(2,4-dimethylindenyl)zirconium dichloride, diisopropylsilanediylbis(2,4-dimethylindenyl)zirconium dichloride, dicyclohexylsilanediylbis(2,4-dimethylindenyl)zirconium dichloride, diphenylsilanediylbis(2,4-dimethylindenyl)zirconium dichloride, (ethyl)(methyl)silanediylbis(2,4-dimethylindenyl)zirconium dichloride, (methyl)(n-propyl)silanediylbis(2,4-dimethylindenyl)zirconium dichloride, (methyl)(isopropyl)silanediylbis(2,4-dimethylindenyl)zirconium dichloride, (cyclohexyl)(methyl)bis(2,4-dimethylindenyl)zirconium dichloride, (methyl)(phenyl)silanediylbis(2,4-dimethylindenyl)zirconium dichloride, and the like.

The substituted moieties of a $\eta^5$-indenyl group in the above-described exemplification include substituted moieties at 2-position, 3-position, 4-position, 5-position, 6-position and 7-position in the case of mono-substituted moieties when a crosslinking group is situated at 1-position, and even if a crosslinking group is situated at positions other than 1-position, likewise include all combinations. In the case of di- or more-substituted moieties, all combinations of substituents and crosslink positions are included likewise. Further exemplified are compounds obtained by changing dichloride $X^1$ in the above-described transition metal compounds into difluoride, dibromide, diiodide, dimethyl, diethyl, diisopropyl, dimethoxide, diethoxide, dipropoxide, dibutoxide, bis(trifluoromethoxide), diphenyl, diphenoxide, bis(2,6-di-tert-butylphenoxide), bis(3,4,5-trifluorophenoxide), bis(pentafluorophenoxide), bis(2,3,5,6-tetrafluoro-4-pentafluorophenylphenoxide), dibenzyl and the like. Moreover, compounds obtained by changing zirconium $M^1$ in the above-described transition metal compounds into titanium or hafnium are exemplified.

As the transition metal compound (A1) of the general formula (1), preferable are ethylenebis(indenyl)zirconium diphenoxide, ethylenebis(indenyl)zirconium dichloride and dimethylsilylenebis(indenyl)zirconium dichloride.

As the transition metal compound (A2) of the general formula (3) in which $M^2$ represents a zirconium atom, $X^2$ represents a chlorine atom and the crosslinking group $Q^2$ is diphenylmethylene group, exemplified are diphenylmethylene(1-cyclopentadienyl)(9-fluorenyl)zirconium dichloride, diphenylmethylene(2-methyl-1-cyclopentadienyl)(9-fluorenyl)zirconium dichloride, diphenylmethylene(3-methyl-1-cyclopentadienyl)(9-fluorenyl)zirconium dichloride, diphenylmethylene(2,4-dimethyl-1-cyclopentadienyl)(9-fluorenyl)zirconium dichloride, diphenylmethylene(2,5-dimethyl-1-cyclopentadienyl)(9-fluorenyl)zirconium dichloride, diphenylmethylene (3,4-dimethyl-1-cyclopentadienyl)(9-fluorenyl)zirconium dichloride, diphenylmethylene(2,3,4-trimethyl-1-cyclopentadienyl)(9-fluorenyl)zirconium dichloride, diphenylmethylene(2,3,5-trimethyl-1-cyclopentadienyl)(9-fluorenyl)zirconium dichloride, diphenylmethylene(3,4,5-trimethyl-1-cyclopentadienyl)(9-fluorenyl)zirconium dichloride, diphenylmethylene (2,3,4,5-tetramethyl-1-cyclopentadienyl)(9-fluorenyl)zirconium dichloride, diphenylmethylene(2-ethyl-1-cyclopentadienyl) (9-fluorenyl)zirconium dichloride, diphenylmethylene(3-ethyl-1-cyclopentadienyl)(9-fluorenyl)zirconium dichloride, diphenylmethylene(2,4-diethyl-1-cyclopentadienyl)(9-fluorenyl)zirconium dichloride, diphenylmethylene(2,5-diethyl-1-cyclopentadienyl)(9-fluorenyl)zirconium dichloride, diphenylmethylene(3,4-diethyl-1-cyclopentadienyl)(9-fluorenyl)zirconium dichloride, diphenylmethylene(2,3,4-triethyl-1-cyclopentadienyl)(9-fluorenyl)zirconium dichloride, diphenylmethylene(2,3,5-triethyl-1-cyclopentadienyl)(9-fluorenyl)zirconium dichloride, diphenylmethylene(3,4,5-triethyl-1-cyclopentadienyl)(9-fluorenyl)zirconium dichloride, diphenylmethylene(2,3,4,5-tetraethyl-1-cyclopentadienyl)(9-fluorenyl)zirconium dichloride, diphenylmethylene(2-n-propyl-1-cyclopentadienyl)(9-fluorenyl)zirconium dichloride, diphenylmethylene(3-n-propyl-1-cyclopentadienyl)(9-fluorenyl)zirconium dichloride, diphenylmethylene(2,4-di-n-propyl-1-cyclopentadienyl)(9-fluorenyl)zirconium dichloride, diphenylmethylene(2,5-di-n-propyl-1-cyclopentadienyl)(9-fluorenyl)zirconium dichloride, diphenylmethylene(3,4-di-n-propyl-1-cyclopentadienyl)(9-fluorenyl)zirconium dichloride, diphenylmethylene(2,3,4-tri-n-propyl-1-cyclopentadienyl) (9-fluorenyl)zirconium dichloride, diphenylmethylene(2,3,5-tri-n-propyl-1-cyclopentadienyl)(9-fluorenyl)zirconium dichloride, diphenylmethylene(3,4,5-tri-n-propyl-1-cyclopentadienyl)(9-fluorenyl)zirconium dichloride, diphenylmethylene(2,3,4,5-tetra-n-propyl-1-cyclopentadienyl)(9-fluorenyl)zirconium dichloride, diphenylmethylene(2-isopropyl-1-cyclopentadienyl)(9-fluorenyl)zirconium dichloride, diphenylmethylene(3-isopropyl-1-cyclopentadienyl)(9-fluorenyl)zirconium dichloride, diphenylmethylene(2,4-diisopropyl-1-cyclopentadienyl)(9-fluorenyl)zirconium dichloride, diphenylmethylene(2,5-diisopropyl-1-cyclopentadienyl)(9-fluorenyl)zirconium dichloride, diphenylmethylene(3,4-diisopropyl-1-cyclopentadienyl)(9-fluorenyl)zirconium dichloride, diphenylmethylene(2,3,4-triisopropyl-1-cyclopentadienyl)(9-fluorenyl)zirconium dichloride, diphenylmethylene(2,3,5-triisopropyl-1-cyclopentadienyl)(9-fluorenyl)zirconium dichloride, diphenylmethylene(3,4,5-triisopropyl-1-cyclopentadienyl)(9-fluorenyl)zirconium dichloride, diphenylmethylene(2,3,4,5-tetraisopropyl-1-cyclopentadienyl)(9-fluorenyl)zirconium dichloride, diphenylmethylene(2-phenyl-1-cyclopentadienyl)(9-fluorenyl)zirconium dichloride, diphenylmethylene (3-phenyl-1-cyclopentadienyl)(9-fluorenyl)zirconium dichloride, diphenylmethylene(2,4-diphenyl-1-cyclopentadienyl)(9-fluorenyl)zirconium dichloride, diphenylmethylene(2,5-diphenyl-1-cyclopentadienyl)(9-fluorenyl)zirconium dichloride, diphenylmethylene(3,4-diphenyl-1-cyclopentadienyl)(9-fluorenyl)zirconium dichloride, diphenylmethylene(2,3,4-triphenyl-1-cyclopentadienyl)(9-fluorenyl)zirconium dichloride, diphenylmethylene(2,3,5-triphenyl-1-cyclopentadienyl)(9-fluorenyl)zirconium dichloride, diphenylmethylene(3,4,5-triphenyl-1-cyclopentadienyl)(9-fluorenyl)zirconium dichloride, diphenylmethylene(2,3,4,5-tetraphenyl-1-cyclopentadienyl)(9-fluorenyl)zirconium dichloride, diphenylmethylene(2-trimethylsilyl-1-cyclopentadienyl)(9-fluorenyl)zirconium dichloride, diphenylmethylene(3-trimethylsilyl-1-cyclopentadienyl)(9-fluorenyl)zirconium dichloride, diphenylmethylene(2,4-bis(trimethylsilyl)-1-cyclopentadienyl)(9-fluorenyl)zirconium dichloride, diphenylmethylene(2,5-bis(trimethylsilyl)-1-cyclopentadienyl)(9-fluorenyl)zirconium dichloride, diphenylmethylene(3,4-bis(trimethylsilyl)-1-cyclopentadienyl)(9-fluorenyl)zirconium dichloride, diphenylmethylene(2,3,4-tris(trimethylsilyl)-1-cyclopentadienyl)(9-fluorenyl) zirconium dichloride, diphenylmethylene(2,3,5-tris (trimethylsilyl)-1-cyclopentadienyl)(9-fluorenyl)zirconium dichloride, diphenylmethylene(3,4,5-tris(trimethylsilyl)-1-cyclopentadienyl)(9-fluorenyl)zirconium dichloride, diphenylmethylene(2,3,4,5-tetrakis(trimethylsilyl)-1-cyclopentadienyl)(9-fluorenyl)zirconium dichloride, diphenylmethylene(1-cyclopentadienyl)(2,7-dimethyl-9-fluorenyl)zirconium dichloride, diphenylmethylene(2-methyl-1-cyclopentadienyl)(2,7-dimethyl-9-fluorenyl)zirconium dichloride, diphenylmethylene(3-methyl-1-cyclopentadienyl)(2,7-dimethyl-9-fluorenyl)zirconium dichloride, diphenylmethylene(2,4-dimethyl-1-cyclopentadienyl)(2,7-dimethyl-9-fluorenyl)zirconium dichloride, diphenylmethylene(2,5-dimethyl-1-cyclopentadienyl)(2,7-dimethyl-9-fluorenyl)zirconium dichloride, diphenylmethylene(3,4-dimethyl-1-cyclopentadienyl)(2,7-dimethyl-9-fluorenyl)zirconium dichloride, diphenylmethylene(2,3,4-trimethyl-1-cyclopentadienyl)(2,7-dimethyl-9-fluorenyl) zirconium dichloride, diphenylmethylene(2,3,5-trimethyl-1-cyclopentadienyl)(2,7-dimethyl-9-fluorenyl)zirconium dichloride, diphenylmethylene(3,4,5-trimethyl-1-cyclopentadienyl)(2,7-dimethyl-9-fluorenyl)zirconium dichloride, diphenylmethylene(2,3,4,5-tetramethyl-1-cyclopentadienyl) (2,7-dimethyl-9-fluorenyl)zirconium dichloride, diphenylmethylene(2-ethyl-1-cyclopentadienyl)(2,7-dimethyl-9-fluorenyl)zirconium dichloride, diphenylmethylene(3-ethyl-1-cyclopentadienyl)(2,7-dimethyl-9-fluorenyl)zirconium dichloride, diphenylmethylene(2,4-diethyl-1-cyclopentadienyl)(2,7-dimethyl-9-fluorenyl)zirconium dichloride, diphenylmethylene(2,5-diethyl-1-cyclopentadienyl)(2,7-dimethyl-9-fluorenyl)zirconium dichloride, diphenylmethylene (3,4-diethyl-1-cyclopentadienyl)(2,7-dimethyl-9-fluorenyl) zirconium dichloride, diphenylmethylene(2,3,4-triethyl-1-cyclopentadienyl)(2,7-dimethyl-9-fluorenyl)zirconium dichloride, diphenylmethylene(2,3,5-triethyl-1-cyclopentadienyl)(2,7-dimethyl-9-fluorenyl)zirconium dichloride, diphenylmethylene(3,4,5-triethyl-1-cyclopentadienyl)(2,7-dimethyl-9-fluorenyl)zirconium dichloride, diphenylmethylene(2,3,4,5-tetraethyl-1-cyclopentadienyl)(2,7-dimethyl-9-fluorenyl)zirconium dichloride, diphenylmethylene(2-n-propyl-1-cyclopentadienyl)(2,7-dimethyl-9-fluorenyl) zirconium dichloride, diphenylmethylene(3-n-propyl-1-cyclopentadienyl)(2,7-dimethyl-9-fluorenyl)zirconium dichloride, diphenylmethylene(2,4-di-n-propyl-1-cyclopentadienyl)(2,7-dimethyl-9-fluorenyl)zirconium dichloride, diphenylmethylene(2,5-di-n-propyl-1-cyclopentadienyl)(2,7-dimethyl-9-fluorenyl)zirconium dichloride, diphenylmethylene(3,4-di-n-propyl-1-cyclopentadienyl)(2,7-dimethyl-9-fluorenyl)zirconium dichloride, diphenylmethylene(2,3,4-tri-n-propyl-1-cyclopentadienyl)(2,7-dimethyl-9-fluorenyl)zirconium dichloride, diphenylmethylene(2,3,5-tri-n-propyl-1-cyclopentadienyl)(2,7-dimethyl-9-fluorenyl)zirconium dichloride, diphenylmethylene(3,4,5-tri-n-propyl-1-cyclopentadienyl)(2,7-dimethyl-9-fluorenyl)zirconium dichloride, diphenylmethylene(2,3,4,5-tetra-n-propyl-1-cyclopentadienyl)(2,7-dimethyl-9-fluorenyl)zirconium dichloride, diphenylmethylene(2-isopropyl-1-cyclopentadienyl)(2,7-dimethyl-9-fluorenyl)zirconium dichloride, diphenylmethylene(3-isopropyl-1-cyclopentadienyl)(2,7-dimethyl-9-fluorenyl)zirconium dichloride, diphenylmethylene(2,4-diisopropyl-1-cyclopentadienyl)(2,7-dimethyl-9-fluorenyl)zirconium dichloride, diphenylmethylene(2,5-diisopropyl-1-cyclopentadienyl)(2,7-dimethyl-9-fluorenyl)zirconium dichloride, diphenylmethylene(3,4-diisopropyl-1-cyclopentadienyl)(2,7-dimethyl-9-fluorenyl)zirconium dichloride, diphenylmethylene(2,3,4-triisopropyl-1-cyclopentadienyl)(2,7-dimethyl-9-fluorenyl)zirconium dichloride, diphenylmethylene(2,3,5-triisopropyl-1-cyclopentadienyl)(2,7-dimethyl-9-fluorenyl)zirconium dichloride, diphenylmethylene(3,4,5-triisopropyl-1-cyclopentadienyl)(2,7-dimethyl-9-fluorenyl)zirconium dichloride, diphenylmethylene(2,3,4,5-tetraisopropyl-1-cyclopentadienyl)(2,7-dimethyl-9-fluorenyl)zirconium dichloride, diphenylmethylene(2-phenyl-1-cyclopentadienyl)(2,7-dimethyl-9-fluorenyl)zirconium dichloride, diphenylmethylene(3-phenyl-1-cyclopentadienyl)(2,7-dimethyl-9-fluorenyl)zirconium dichloride, diphenylmethylene(2,4-diphenyl-1-cyclopentadienyl)(2,7-dimethyl-9-fluorenyl)zirconium dichloride, diphenylmethylene(2,5-diphenyl-1-cyclopentadienyl)(2,7-dimethyl-9-fluorenyl)zirconium dichloride, diphenylmethylene(3,4-diphenyl-1-cyclopentadienyl)(2,7-dimethyl-9-fluorenyl)zirconium dichloride, diphenylmethylene(2,3,4-triphenyl-1-cyclopentadienyl)(2,7-dimethyl-9-fluorenyl)zirconium dichloride, diphenylmethylene(2,3,5-triphenyl-1-cyclopentadienyl)(2,7-dimethyl-9-fluorenyl)zirconium dichloride, diphenylmethylene(3,4,5-triphenyl-1-cyclopentadienyl)(2,7-dimethyl-9-fluorenyl)zirconium dichloride, diphenylmethylene(2,3,4,5-tetraphenyl-1-cyclopentadienyl)(2,7-dimethyl-9-fluorenyl)zirconium dichloride, diphenylmethylene(2-trimethylsilyl-1-cyclopentadienyl)(2,7-dimethyl-9-fluorenyl)zirconium dichloride, diphenylmethylene(3-trimethylsilyl-1-cyclopentadienyl)(2,7-dimethyl-9-fluorenyl)zirconium dichloride, diphenylmethylene(2,4-bis(trimethylsilyl)-1-cyclopentadienyl)(2,7-dimethyl-9-fluorenyl)zirconium dichloride, diphenylmethylene(2,5-bis(trimethylsilyl)-1-cyclopentadienyl)(2,7-dimethyl-9-fluorenyl)zirconium dichloride, diphenylmethylene(3,4-bis(trimethylsilyl)-1-cyclopentadienyl)(2,7-dimethyl-9-fluorenyl)zirconium dichloride, diphenylmethylene(2,3,4-tris(trimethylsilyl)-1-cyclopentadienyl)(2,7-dimethyl-9-fluorenyl)zirconium dichloride, diphenylmethylene(2,3,5-tris(trimethylsilyl)-1-cyclopentadienyl)(2,7-dimethyl-9-fluorenyl)zirconium dichloride, diphenylmethylene(3,4,5-tris(trimethylsilyl)-1-cyclopentadienyl)(2,7-dimethyl-9-fluorenyl)zirconium dichloride, diphenylmethylene(2,3,4,5-tetrakis(trimethylsilyl)-1-cyclopentadienyl)(2,7-dimethyl-9-fluorenyl)zirconium dichloride, diphenylmethylene(1-cyclopentadienyl)(2,7-diethyl-9-fluorenyl)zirconium dichloride, diphenylmethylene(2-methyl-1-cyclopentadienyl)(2,7-diethyl-9-fluorenyl)zirconium dichloride, diphenylmethylene(3-methyl-1-cyclopentadienyl)(2,7-diethyl-9-fluorenyl)zirconium dichloride, diphenylmethylene(2,4-dimethyl-1-cyclopentadienyl)(2,7-diethyl-9-fluorenyl)zirconium dichloride, diphenylmethylene(2,5-dimethyl-1-cyclopentadienyl)(2,7-diethyl-9-fluorenyl)zirconium dichloride, diphenylmethylene(3,4-dimethyl-1-cyclopentadienyl)(2,7-diethyl-9-fluorenyl)zirconium dichloride, diphenylmethylene(2,3,4-trimethyl-1-cyclopentadienyl)(2,7-diethyl-9-fluorenyl)zirconium dichloride, diphenylmethylene(2,3,5-trimethyl-1-cyclopentadienyl)(2,7-diethyl-9-fluorenyl)zirconium dichloride, diphenylmethylene(3,4,5-trimethyl-1-cyclopentadienyl)(2,7-diethyl-9-fluorenyl)zirconium dichloride, diphenylmethylene(2,3,4,5-tetramethyl-1-cyclopentadienyl)(2,7-diethyl-9-fluorenyl)zirconium dichloride, diphenylmethylene(2-ethyl-1-cyclopentadienyl)(2,7-diethyl-9-fluorenyl)zirconium dichloride, diphenylmethylene(3-ethyl-1-cyclopentadienyl)(2,7-diethyl-9-fluorenyl)zirconium dichloride, diphenylmethylene(2,4-diethyl-1-cyclopentadienyl)(2,7-diethyl-9-fluorenyl)zirconium dichloride, diphenylmethylene(2,5-diethyl-1-cyclopentadienyl)(2,7-diethyl-9-fluorenyl)zirconium dichloride, diphenylmethylene(3,4-diethyl-1-cyclopentadienyl)(2,7-diethyl-9-fluorenyl)zirconium dichloride, diphenylmethylene(2,3,4-triethyl-1-cyclopentadienyl)(2,7-diethyl-9-fluorenyl)zirconium dichloride, diphenylmethylene(2,3,5-triethyl-1-cyclopentadienyl)(2,7-diethyl-9-fluorenyl)zirconium dichloride, diphenylmethylene(3,4,5-triethyl-1-cyclopentadienyl)(2,7-diethyl-9-fluorenyl)zirconium dichloride, diphenylmethylene(2,3,4,5-tetraethyl-1-cyclopentadienyl)(2,7-diethyl-9-fluorenyl)zirconium dichloride, diphenylmethylene(2-n-propyl-1-cyclopentadienyl)(2,7-diethyl-9-fluorenyl)zirconium dichloride, diphenylmethylene(3-n-propyl-1-cyclopentadienyl)(2,7-diethyl-9-fluorenyl)zirconium dichloride, diphenylmethylene(2,4-di-n-propyl-1-cyclopentadienyl)(2,7-diethyl-9-fluorenyl)zirconium dichloride, diphenylmethylene(2,5-di-n-propyl-1-cyclopentadienyl)(2,7-diethyl-9-fluorenyl)zirconium dichloride, diphenylmethylene(3,4-di-n-propyl-1-cyclopentadienyl)(2,7-diethyl-9-fluorenyl)zirconium dichloride, diphenylmethylene(2,3,4-tri-n-propyl-1-cyclopentadienyl)(2,7-diethyl-9-fluorenyl)zirconium dichloride, diphenylmethylene(2,3,5-tri-n-propyl-1-cyclopentadienyl)(2,7-diethyl-9-fluorenyl)zirconium dichloride, diphenylmethylene(3,4,5-tri-n-propyl-1-cyclopentadienyl)(2,7-diethyl-9-fluorenyl)zirconium dichloride, diphenylmethylene(2,3,4,5-tetra-n-propyl-1-cyclopentadienyl)(2,7-diethyl-9-fluorenyl)zirconium dichloride, diphenylmethylene(2-isopropyl-1-cyclopentadienyl)(2,7-diethyl-9-fluorenyl)zirconium dichloride, diphenylmethylene(3-isopropyl-1-cyclopentadienyl)(2,7-diethyl-9-fluorenyl)zirconium dichloride, diphenylmethylene(2,4-diisopropyl-1-cyclopentadienyl)(2,7-diethyl-9-fluorenyl)zirconium dichloride, diphenylmethylene(2,5-diisopropyl-1-cyclopentadienyl)(2,7-diethyl-9-fluorenyl)zirconium dichloride, diphenylmethylene(3,4-diisopropyl-1-cyclopentadienyl)(2,7-diethyl-9-fluorenyl)zirconium dichloride, diphenylmethylene(2,3,4-triisopropyl-1-cyclopentadienyl)(2,7-diethyl-9-fluorenyl)zirconium dichloride, diphenylmethylene(2,3,5-triisopropyl-1-cyclopentadienyl)(2,7-diethyl-9-fluorenyl)zirconium dichloride, diphenylmethylene(3,4,5-triisopropyl-1-cyclopentadienyl)(2,7-diethyl-9-fluorenyl)zirconium dichloride, diphenylmethylene(2,3,4,5-tetraisopropyl-1-cyclopentadienyl)(2,7-diethyl-9-fluorenyl)zirconium dichloride, diphenylmethylene(2-phenyl-1-cyclopentadienyl)(2,7-diethyl-9-fluorenyl)zirconium dichloride, diphenylmethylene(3-phenyl-1-cyclopentadienyl)(2,7-diethyl-9-fluorenyl)zirconium dichloride, diphenylmethylene(2,4-diphenyl-1-cyclopentadienyl)(2,7-diethyl-9-fluorenyl)zirconium dichloride, diphenylmethylene(2,5-diphenyl-1-cyclopentadienyl)(2,7-diethyl-9-fluorenyl)zirconium dichloride, diphenylmethylene(3,4-diphenyl-1-cyclopentadienyl)(2,7-diethyl-9-fluorenyl)zirconium dichloride, diphenylmethylene(2,3,4-triphenyl-1-cyclopentadienyl)(2,7-diethyl-9-fluorenyl)zirconium dichloride, diphenylmethylene(2,3,5-triphenyl-1-cyclopentadienyl)(2,7-diethyl-9-fluorenyl)zirconium dichloride, diphenylmethylene(3,4,5-triphenyl-1-cyclopentadienyl)(2,7-diethyl-9-fluorenyl)zirconium dichloride, diphenylmethylene(2,3,4,5-tetraphenyl-1-cyclopentadienyl)(2,7-diethyl-9-fluorenyl)zirconium dichloride, diphenylmethylene(2-trimethylsilyl-1-cyclopentadienyl)(2,7-diethyl-9-fluorenyl)zirconium dichloride, diphenylmethylene(3-trimethylsilyl-1-cyclopentadienyl)(2,7-diethyl-9-fluorenyl)zirconium dichloride, diphenylmethylene(2,4-bis(trimethylsilyl)-1-cyclopentadienyl)(2,7-diethyl-9-fluorenyl)zirconium dichloride, diphenylmethylene(2,5-bis(trimethylsilyl)-1-cyclopentadienyl)(2,7-diethyl-9-fluorenyl)zirconium dichloride, diphenylmethylene(3,4-bis(trimethylsilyl)-1-cyclopentadienyl)(2,7-diethyl-9-fluorenyl)zirconium dichloride, diphenylmethylene(2,3,4-tris(trimethylsilyl)-1-cyclopentadienyl)(2,7-diethyl-9-fluorenyl)zirconium dichloride, diphenylmethylene(2,3,5-tris(trimethylsilyl)-1-cyclopentadienyl)(2,7-diethyl-9-fluorenyl)zirconium dichloride, diphenylmethylene(3,4,5-tris(trimethylsilyl)-1-cyclopentadienyl)(2,7-diethyl-9-fluorenyl)zirconium dichloride, diphenylmethylene(2,3,4,5-tetrakis(trimethylsilyl)-1-cyclopentadienyl)(2,7-diethyl-9-fluorenyl)zirconium dichloride, diphenylmethylene(1-cyclopentadienyl)(2,7-di-t-butyl-9-fluorenyl)zirconium dichloride, diphenylmethylene(2-methyl-1-cyclopentadienyl)(2,7-di-t-butyl-9-fluorenyl)zirconium dichloride, diphenylmethylene(3-methyl-1-cyclopentadienyl)(2,7-di-t-butyl-9-fluorenyl)zirconium dichloride, diphenylmethylene(2,4-dimethyl-1-cyclopentadienyl)(2,7-di-t-butyl-9-fluorenyl)zirconium dichloride, diphenylmethylene(2,5-dimethyl-1-cyclopentadienyl)(2,7-di-t-butyl-9-fluorenyl)zirconium dichloride, diphenylmethylene(3,4-dimethyl-1-cyclopentadienyl)(2,7-di-t-butyl-9-fluorenyl)zirconium dichloride, diphenylmethylene(2,3,4-trimethyl-1-cyclopentadienyl)(2,7-di-t-butyl-9-fluorenyl)zirconium dichloride, diphenylmethylene(2,3,5-trimethyl-1-cyclopentadienyl)(2,7-di-t-butyl-9-fluorenyl)zirconium dichloride, diphenylmethylene(3,4,5-trimethyl-1-cyclopentadienyl)(2,7-di-t-butyl-9-fluorenyl)zirconium dichloride, diphenylmethylene(2,3,4,5-tetramethyl-1-cyclopentadienyl)(2,7-di-t-butyl-9-fluorenyl)zirconium dichloride, diphenylmethylene(2-ethyl-1-cyclopentadienyl)(2,7-di-t-butyl-9-fluorenyl)zirconium dichloride, diphenylmethylene(3-ethyl-1-cyclopentadienyl)(2,7-di-t-butyl-9-fluorenyl)zirconium dichloride, diphenylmethylene(2,4-diethyl-1-cyclopentadienyl)(2,7-di-t-butyl-9-fluorenyl)zirconium dichloride, diphenylmethylene(2,5-diethyl-1-cyclopentadienyl)(2,7-di-t-butyl-9-fluorenyl)zirconium dichloride, diphenylmethylene(3,4-diethyl-1-cyclopentadienyl)(2,7-di-t-butyl-9-fluorenyl)zirconium dichloride, diphenylmethylene(2,3,4-triethyl-1-cyclopentadienyl)(2,7-di-t-butyl-9-fluorenyl)zirconium dichloride, diphenylmethylene(2,3,5-triethyl-1-cyclopentadienyl)(2,7-di-t-butyl-9-fluorenyl)zirconium dichloride, diphenylmethylene(3,4,5-triethyl-1-cyclopentadienyl)(2,7-di-t-butyl-9-fluorenyl)zirconium dichloride, diphenylmethylene(2,3,4,5-tetraethyl-1-cyclopentadienyl)(2,7-di-t-butyl-9-fluorenyl)zirconium dichloride, diphenylmethylene(2-n-propyl-1-cyclopentadienyl)(2,7-di-t-butyl-9-fluorenyl)zirconium dichloride, diphenylmethylene(3-n-propyl-1-cyclopentadienyl)(2,7-di-t-butyl-9-fluorenyl)zirconium dichloride, diphenylmethylene(2,4-di-n-propyl-1-cyclopentadienyl)(2,7-di-t-butyl-9-fluorenyl)zirconium dichloride, diphenylmethylene(2,5-di-n-propyl-1-cyclopentadienyl)(2,7-di-t-butyl-9-fluorenyl)zirconium dichloride, diphenylmethylene(3,4-di-n-propyl-1-cyclopentadienyl)(2,7-di-t-butyl-9-fluorenyl)zirconium dichloride, diphenylmethylene(2,3,4-tri-n-propyl-1-cyclopentadienyl)(2,7-di-t-butyl-9-fluorenyl)zirconium dichloride, diphenylmethylene(2,3,5-tri-n-propyl-1-cyclopentadienyl)(2,7-di-t-butyl-9-fluorenyl)zirconium dichloride, diphenylmethylene(3,4,5-tri-n-propyl-1-cyclopentadienyl)(2,7-di-t-butyl-9-fluorenyl)zirconium dichloride, diphenylmethylene(2,3,4,5-tetra-n-propyl-1-cyclopentadienyl)(2,7-di-t-butyl-9-fluorenyl)zirconium dichloride, diphenylmethylene(2-isopropyl-1-cyclopentadienyl)(2,7-di-t-butyl-9-fluorenyl)zirconium dichloride, diphenylmethylene(3-isopropyl-1-cyclopentadienyl)(2,7-di-t-butyl-9-fluorenyl)zirconium dichloride, diphenylmethylene(2,4-diisopropyl-1-cyclopentadienyl)(2,7-di-t-butyl-9-fluorenyl)zirconium dichloride, diphenylmethylene(2,5-diisopropyl-1-cyclopentadienyl)(2,7-di-t-butyl-9-fluorenyl)zirconium dichloride, diphenylmethylene(3,4-diisopropyl-1-cyclopentadienyl)(2,7-di-t-butyl-9-fluorenyl)zirconium dichloride, diphenylmethylene(2,3,4-triisopropyl-1-cyclopentadienyl)(2,7-di-t-butyl-9-fluorenyl)zirconium dichloride, diphenylmethylene(2,3,5-triisopropyl-1-cyclopentadienyl)(2,7-di-t-butyl-9-fluorenyl)zirconium dichloride, diphenylmethylene(3,4,5-triisopropyl-1-cyclopentadienyl)(2,7-di-t-butyl-9-fluorenyl)zirconium dichloride, diphenylmethylene(2,3,4,5-tetraisopropyl-1-cyclopentadienyl)(2,7-di-t-butyl-9-fluorenyl)zirconium dichloride, diphenylmethylene(2-phenyl-1-cyclopentadienyl)(2,7-di-t-butyl-9-fluorenyl)zirconium dichloride, diphenylmethylene(3-phenyl-1-cyclopentadienyl)(2,7-di-t-butyl-9-fluorenyl)zirconium dichloride, diphenylmethylene(2,4-diphenyl-1-cyclopentadienyl)(2,7-di-t-butyl-9-fluorenyl)zirconium dichloride, diphenylmethylene(2,5-diphenyl-1-cyclopentadienyl)(2,7-di-t-butyl-9-fluorenyl)zirconium dichloride, diphenylmethylene(3,4-diphenyl-1-cyclopentadienyl)(2,7-di-t-butyl-9-fluorenyl)zirconium dichloride, diphenylmethylene(2,3,4-triphenyl-1-cyclopentadienyl)(2,7-di-t-butyl-9-fluorenyl)zirconium dichloride, diphenylmethylene(2,3,5-triphenyl-1-cyclopentadienyl)(2,7-di-t-butyl-9-fluorenyl)zirconium dichloride, diphenylmethylene(3,4,5-triphenyl-1-cyclopentadienyl)(2,7-di-t-butyl-9-fluorenyl)zirconium dichloride, diphenylmethylene(2,3,4,5-tetraphenyl-1-cyclopentadienyl)(2,7-di-t-butyl-9-fluorenyl)zirconium dichloride, diphenylmethylene(2-trimethylsilyl-1-cyclopentadienyl)(2,7-di-t-butyl-9-fluorenyl)zirconium dichloride, diphenylmethylene(3-trimethylsilyl-1-cyclopentadienyl)(2,7-di-t-butyl-9-fluorenyl)zirconium dichloride, diphenylmethylene(2,4-bis(trimethylsilyl)-1-cyclopentadienyl)(2,7-di-t-butyl-9-fluorenyl)zirconium dichloride, diphenylmethylene(2,5-bis(trimethylsilyl)-1-cyclopentadienyl)(2,7-di-t-butyl-9-fluorenyl)zirconium dichloride, diphenylmethylene(3,4-bis(trimethylsilyl)-1-cyclopentadienyl)(2,7-di-t-butyl-9-fluorenyl)zirconium dichloride, diphenylmethylene(2,3,4-tris(trimethylsilyl)-1-cyclopentadienyl)(2,7-di-t-butyl-9-fluorenyl)zirconium dichloride, diphenylmethylene(2,3,5-tris(trimethylsilyl)-1-cyclopentadienyl)(2,7-di-t-butyl-9-fluorenyl)zirconium dichloride, diphenylmethylene(3,4,5-tris(trimethylsilyl)-1-cyclopentadienyl)(2,7-di-t-butyl-9-fluorenyl)zirconium dichloride, diphenylmethylene(2,3,4,5-tetrakis(trimethylsilyl)-1-cyclopentadienyl)(2,7-di-t-butyl-9-fluorenyl)zirconium dichloride, and the like.

Compounds obtained by changing dichloride $X^2$ in the above-described transition metal compound into difluoride, dibromide, diiodide, dimethyl, diethyl, diisopropyl, dimethoxide, diethoxide, dipropoxide, dibutoxide, bis(trifluoromethoxide), diphenyl, diphenoxide, bis(2,6-di-tert-butylphenoxide), bis(3,4,5-trifluorophenoxide), bis(pentafluorophenoxide), bis(2,3,5,6-tetrafluoro-4-pentafluorophenylphenoxide), dibenzyl and the like are exemplified. Further, compounds obtained by changing the diphenylmethylene group $Q^2$ in the above-described transition metal compound into a methylene group, ethylene group, isopropylidene group, methylphenylmethylene group, dimethylsilanediyl group, diphenylsilanediyl group, silacyclobutanediyl group, silacyclohexanediyl group and the like are exemplified. Moreover, compounds obtained by changing zirconium $M^2$ in the above-described transition metal compound into titanium or hafnium are also exemplified.

As the transition metal compound (A2) of the general formula (3), preferable is diphenylmethylene(1-cyclopentadienyl)(9-fluorenyl)zirconium dichloride.

As the cocatalyst component (B) to be used for preparation of a polymerization catalyst used in production of the ethylene-α-olefin copolymer of the present invention, solid catalyst components formed by bringing the following component (b1), the following component (b2), the following component (b3) and the following component (b4) into contact are mentioned.

(b1): a compound of the following general formula (5):

$$M^3L_x \qquad (5)$$

[wherein, $M^3$ represents a lithium atom, sodium atom, potassium atom, rubidium atom, cesium atom, beryllium atom, magnesium atom, calcium atom, strontium atom, barium atom, zinc atom, germanium atom, tin atom, lead atom, antimony atom or bismuth atom, and x represents a number corresponding to the atomic valence of $M^3$. L represents a hydrogen atom, halogen atom or optionally substituted hydrocarbyl group, and when there exist a plurality of L, these may be mutually the same or different.]

(b2): a compound of the following general formula (6):

$$R^6_{t-1}T^1H \qquad (6)$$

[wherein, $T^1$ represents an oxygen atom, sulfur atom, nitrogen atom or phosphorus atom, t represents a number corresponding to the atomic valence of $T^1$. $R^6$ represents a halogen atom, electron attractive group, halogen atom-containing group or electron attractive group-containing group, and when there exist a plurality of $R^6$, these may be mutually the same or different.]

(b3): a compound of the following general formula (7):

$$R^7_{s-2}T^2H_2 \qquad (7)$$

[wherein, $T^2$ represents an oxygen atom, sulfur atom, nitrogen atom or phosphorus atom, and s represents a number corresponding to the atomic valence of $T^2$. $R^7$ represents a halogen atom, hydrocarbyl group or halogenated hydrocarbyl group.]

(b4): a particulate carrier $M^3$ in the general formula (5) represents a lithium atom, sodium atom, potassium atom, rubidium atom, cesium atom, beryllium atom, magnesium atom, calcium atom, strontium atom, barium atom, zinc atom, germanium atom, tin atom, lead atom, antimony atom or bismuth atom. $M^3$ represents preferably a magnesium atom, calcium atom, strontium atom, barium atom, zinc atom, germanium atom, tin atom or bismuth atom, more preferably a magnesium atom, zinc atom, tin atom or bismuth atom, and further preferably a zinc atom.

x in the general formula (5) represents a number corresponding to the atomic valence of $M^3$. For example, when $M^3$ represents a zinc atom, x represents 2.

L in the general formula (5) represents a hydrogen atom, halogen atom or optionally substituted hydrocarbyl group, and when there exist a plurality of L, these may be mutually the same or different.

The halogen atom represented by L includes a fluorine atom, chlorine atom, bromine atom, iodine atom and the like.

The optionally substituted hydrocarbyl group represented by L includes an alkyl group, aralkyl group, aryl group, halogenated alkyl group and the like.

The alkyl group represented by L is preferably an alkyl group having 1 to 20 carbon atoms, and examples thereof include a methyl group, ethyl group, n-propyl group, isopropyl group, n-butyl group, isobutyl group, sec-butyl group, tert-butyl group, n-pentyl group, neopentyl group, isopentyl group, n-hexyl group, n-heptyl group, n-octyl group, n-decyl group, n-nonyl group, n-decyl group, n-dodecyl group, n-dodecyl group, n-tridecyl group, n-tetradecyl group, n-pentadecyl group, n-hexadecyl group, n-heptadecyl group, n-octadecyl group, n-nonadecyl group, n-eicosyl group and the like. Preferably, it is a methyl group, ethyl group, isopropyl group, tert-butyl group or isobutyl group.

The halogenated alkyl group represented by L is preferably a halogenated alkyl group having 1 to 20 carbon atoms, and examples thereof include a fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group and the like.

The aralkyl group represented by L is preferably an aralkyl group having 7 to 20 carbon atoms, and examples thereof include a benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (4,6-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-decylphenyl)methyl group, (n-tetradecylphenyl)methyl group, naphthylmethyl group, anthracenylmethyl group, phenylethyl group, phenylpropyl group, phenylbutyl group, diphenylmethyl group, diphenylethyl group, diphenylpropyl group, diphenylbutyl group and the like. Preferable is a benzyl group. Further mentioned are halogenated aralkyl groups having 7 to 20 carbon atoms obtained by substitution on these aralkyl groups with a halogen atom such as a fluorine atom, chlorine atom, bromine atom or iodine atom, and the like.

The aryl group represented by L is preferably an aryl group having 6 to 20 carbon atoms, and examples thereof include a phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, diethylphenyl group, triethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group and the like. Preferable is a phenyl group. Further mentioned are halogenated aryl groups having 6 to 20 carbon atoms obtained by substitution on these aryl groups with a halogen atom such as a fluorine atom, chlorine atom, bromine atom or iodine atom, and the like.

L represents preferably a hydrogen atom, alkyl group or aryl group, more preferably a hydrogen atom or alkyl group, and further preferably an alkyl group.

$T^1$ in the general formula (6) represents an oxygen atom, sulfur atom, nitrogen atom or phosphorus atom, preferably a nitrogen atom or oxygen atom, more preferably an oxygen atom.

t in the general formula (6) represents the atomic valence of $T^1$, and when $T^1$ represents an oxygen atom or sulfur atom, t is 2 and when $T^1$ represents a nitrogen atom or phosphorus atom, t is 3.

$R^6$ in the general formula (6) represents a halogen atom, electron attractive group, halogen atom-containing group, electron attractive group-containing group or electron attractive group, and when there exist a plurality of $R^6$, these may be mutually the same or different. As an index of electron attractivity, the Hammett's rule substituent constant σ is known, and functional groups having positive Hammett's rule substituent constant σ are mentioned as the electron attractive group.

The halogen atom represented by $R^6$ includes a fluorine atom, chlorine atom, bromine atom, iodine atom and the like.

The electron attractive group represented by $R^6$ includes a cyano group, nitro group, carbonyl group, hydrocarbyloxycarbonyl group, sulfone group, phenyl group and the like.

The halogen atom-containing group represented by $R^6$ includes halogenated hydrocarbyl groups such as a halogenated alkyl group, halogenated aralkyl group, halogenated aryl group, (halogenated alkyl)aryl group and the like; halogenated hydrocarbyloxy groups; halogenated hydrocarbyloxycarbonyl groups and the like. The electron attractive group-containing group represented by $R^6$ includes cyanated hydrocarbyl groups such as a cyanated aryl group and the like, nitrated hydrocarbyl groups such as a nitrated aryl group and the like, etc.

The halogenated alkyl group represented by $R^6$ includes a fluoromethyl group, chloromethyl group, bromomethyl group, iodomethyl group, difluoromethyl group, dichloromethyl group, dibromomethyl group, diiodomethyl group, trifluoromethyl group, trichloromethyl group, tribromomethyl group, triiodomethyl group, 2,2,2-trifluoroethyl group, 2,2,2-trichloroethyl group, 2,2,2-tribromoethyl group, 2,2,2-triiodoethyl group, 2,2,3,3,3-pentafluoropropyl group, 2,2,3,3,3-pentachloropropyl group, 2,2,3,3,3-pentabromopropyl group, 2,2,3,3,3-pentaiodopropyl group, 2,2,2-trifluoro-1-trifluoromethylethyl group, 2,2,2-trichloro-1-trichloromethylethyl group, 2,2,2-tribromo-1-tribromomethylethyl group, 2,2,2-triiodo-1-triiodomethylethyl group, 1,1-bis(trifluoromethyl)-2,2,2-trifluoroethyl group, 1,1-bis(trichloromethyl)-2,2,2-trichloroethyl group, 1,1-bis(tribromomethyl)-2,2,2-tribromoethyl group, 1,1-bis(triiodomethyl)-2,2,2-triiodoethyl group and the like.

The halogenated aryl group represented by $R^6$ includes a 2-fluorophenyl group, 3-fluorophenyl group, 4-fluorophenyl group, 2,4-difluorophenyl group, 2,6-difluorophenyl group, 3,4-difluorophenyl group, 3,5-difluorophenyl group, 2,4,6-trifluorophenyl group, 3,4,5-trifluorophenyl group, 2,3,5,6-tetrafluorophenyl group, pentafluorophenyl group, 2,3,5,6-tetrafluoro-4-trifluoromethylphenyl group, 2,3,5,6-tetrafluoro-4-pentafluorophenylphenyl group, perfluoro-1-naphthyl group, perfluoro-2-naphthyl group, 2-chlorophenyl group, 3-chlorophenyl group, 4-chlorophenyl group, 2,4-dichlorophenyl group, 2,6-dichlorophenyl group, 3,4-dichlorophenyl group, 3,5-dichlorophenyl group, 2,4,6-trichlorophenyl group, 3,4,5-trichlorophenyl group, 2,3,5,6-tetrachlorophenyl group, pentachlorophenyl group, 2,3,5,6-tetrachloro-4-trichloromethylphenyl group, 2,3,5,6-tetrachloro-4-pentachlorophenylphenyl group, perchloro-1-naphthyl group, perchloro-2-naphthyl group, 2-bromophenyl group, 3-bromophenyl group, 4-bromophenyl group, 2,4-dibromophenyl group, 2,6-dibromophenyl group, 3,4-dibromophenyl group, 3,5-dibromophenyl group, 2,4,6-tribromophenyl group, 3,4,5-tribromophenyl group, 2,3,5,6-tetrabromophenyl group, pentabromophenyl group, 2,3,5,6-tetrabromo-4-tribromomethylphenyl group, 2,3,5,6-tetrabromo-4-pentabromophenylphenyl group, perbromo-1-naphthyl group, perbromo-2-naphthyl group, 2-iodophenyl group, 3-iodophenyl group, 4-iodophenyl group, 2,4-diiodophenyl group, 2,6-diiodophenyl group, 3,4-diiodophenyl group, 3,5-diiodophenyl group, 2,4,6-triiodophenyl group, 3,4,5-triiodophenyl group, 2,3,5,6-tetraiodophenyl group, pentaiodophenyl group, 2,3,5,6-tetraiodo-4-triiodomethylphenyl group, 2,3,5,6-tetraiodo-4-pentaiodophenyl group, periodo-1-naphthyl group, periodo-2-naphthyl group and the like.

The (halogenated alkyl)aryl group represented by $R^6$ includes a 2-(trifluoromethyl)phenyl group, 3-(trifluoromethyl)phenyl group, 4-(trifluoromethyl)phenyl group, 2,6-bis(trifluoromethyl)phenyl group, 3,5-bis(trifluoromethyl)phenyl group, 2,4,6-tris(trifluoromethyl)phenyl group, 3,4,5-tris(trifluoromethyl)phenyl group and the like.

The cyanated aryl group represented by $R^6$ includes a 2-cyanophenyl group, 3-cyanophenyl group, 4-cyanophenyl group and the like.

The nitrated aryl group represented by $R^6$ includes a 2-nitrophenyl group, 3-nitrophenyl group, 4-nitrophenyl group and the like.

The hydrocarbyloxycarbonyl group represented by $R^6$ includes an alkoxycarbonyl group, aralkyloxycarbonyl group, aryloxycarbonyl group and the like, more specifically a methoxycarbonyl group, ethoxycarbonyl group, n-propoxycarbonyl group, isopropoxycarbonyl group, phenoxycarbonyl group and the like.

The halogenated hydrocarbyloxycarbonyl group represented by $R^6$ includes a halogenated alkoxycarbonyl group, halogenated aralkyloxycarbonyl group, halogenated aryloxycarbonyl group and the like, more specifically a trifluoromethoxycarbonyl group, pentafluorophenoxycarbonyl group and the like.

$R^6$ represents preferably a halogenated hydrocarbyl group, more preferably a halogenated alkyl group or halogenated aryl group, further preferably a fluorinated alkyl group, fluorinated aryl group, chlorinated alkyl group or chlorinated aryl group, and particularly preferably a fluorinated alkyl group or fluorinated aryl group. The fluorinated alkyl group is preferably a fluoromethyl group, difluoromethyl group, trifluoromethyl group, 2,2,2-trifluoroethyl group, 2,2,3,3,3-pentafluoropropyl group, 2,2,2-trifluoro-1-trifluoromethylethyl group or 1,1-bis(trifluoromethyl)-2,2,2-trifluoroethyl group, more preferably a trifluoromethyl group, 2,2,2-trifluoro-1-trifluoromethylethyl group or 1,1-bis(trifluoromethyl)-2,2,2-trifluoroethyl group. The fluorinated aryl group is preferably a 2-fluorophenyl group, 3-fluorophenyl group, 4-fluorophenyl group, 2,4-difluorophenyl group, 2,6-difluorophenyl group, 3,4-difluorophenyl group, 3,5-difluorophenyl group, 2,4,6-trifluorophenyl group, 3,4,5-trifluorophenyl group, 2,3,5,6-tetrafluorophenyl group, pentafluorophenyl group, 2,3,5,6-tetrafluoro-4-trifluoromethylphenyl group, 2,3,5,6-tetrafluoro-4-pentafluorophenylphenyl group, perfluoro-1-naphthyl group or perfluoro-2-naphthyl group, more preferably a 3,5-difluorophenyl group, 3,4,5-trifluorophenyl group or pentafluorophenyl group. The chlorinated alkyl group is preferably a chloromethyl group, dichloromethyl group, trichloromethyl group, 2,2,2-trichloroethyl group, 2,2,3,3,3-pentachloropropyl group, 2,2,2-trichloro-1-trichloromethylethyl group or 1,1-bis(trichloromethyl)-2,2,2-trichloroethyl group. The chlorinated aryl group is preferably a 4-chlorophenyl group, 2,6-dichlorophenyl group, 3.5-dichlorophenyl group, 2,4,6-trichlorophenyl group, 3,4,5-trichlorophenyl group or pentachlorophenyl group.

$T^2$ in the general formula (7) represents an oxygen atom, sulfur atom, nitrogen atom or phosphorus atom, preferably a nitrogen atom or oxygen atom, more preferably an oxygen atom.

s in the general formula (7) represents the atomic valence of $T^2$, and when $T^2$ represents an oxygen atom or sulfur atom, s is 2 and when $T^2$ represents a nitrogen atom or phosphorus atom, s is 3.

$R^7$ in the general formula (7) represents a hydrocarbyl group or halogenated hydrocarbyl group. The hydrocarbyl group represented by $R^7$ includes an alkyl group, aralkyl group, aryl group and the like, and exemplified are those exemplified as the alkyl group, aralkyl group and aryl group represented by L. The halogenated hydrocarbyl group represented by $R^7$ includes halogenated hydrocarbyl groups such as a halogenated alkyl group, halogenated aralkyl group, halogenated aryl group, (halogenated alkyl)aryl group and the like, and exemplified are those exemplified as the halogenated alkyl group, halogenated aryl group and (halogenated alkyl)aryl group represented by $R^6$.

$R^7$ represents preferably a halogenated hydrocarbyl group, more preferably a fluorinated hydrocarbyl group.

The compound of the general formula (5) in which $M^3$ represents a zinc atom as the component (b1) includes dialkylzincs such as dimethylzinc, diethylzinc, di-n-propylzinc, diisopropylzinc, di-n-butylzinc, diisobutylzinc, di-n-hexylzinc and the like; diarylzincs such as diphenylzinc, dinaphthylzinc, bis(pentafluorophenyl)zinc and the like; dialkenylzincs such as diarylzinc and the like; bis(cyclopentadienyl)zinc; halogenated alkylzincs such as methylzinc chloride, ethylzinc chloride, n-propylzinc chloride, isopropylzinc chloride, n-butylzinc chloride, isobutylzinc chloride, n-hexylzinc chloride, methylzinc bromide, ethylzinc bromide, n-propylzinc bromide, isopropylzinc bromide, n-butylzinc bromide, isobutylzinc bromide, n-hexylzinc bromide, methylzinc iodide, ethylzinc iodide, n-propylzinc iodide, isopropylzinc iodide, n-butylzinc iodide, isobutylzinc iodide, n-hexylzinc iodide and the like; halogenated zincs such as zinc fluoride, zinc chloride, zinc bromide, zinc iodide and the like, etc.

The compound of the general formula (5) as the component (b1) is preferably dialkylzinc, further preferably dimethylzinc, diethylzinc, di-n-propylzinc, diisopropylzinc, di-n-butylzinc, diisobutylzinc or di-n-hexylzinc, and particularly preferably dimethylzinc or diethylzinc.

The compound of the general formula (6) as the component (b2) includes an amine, phosphine, alcohol, thiol, phenol, thiophenol, naphthol, naphthylthiol, carboxylic acid compound and the like.

The amine includes di(fluoromethyl)amine, bis(difluoromethyl)amine, bis(trifluoromethyl)amine, bis(2,2,2-trifluoroethyl)amine, bis(2,2,3,3,3-pentafluoropropyl)amine, bis(2,2,2-trifluoro-1-trifluoromethylethyl)amine, bis(1,1-bis(trifluoromethyl)-2,2,2-trifluoroethyl)amine, bis(2-fluorophenyl)amine, bis(3-fluorophenyl)amine, bis(4-fluorophenyl)amine, bis(2,6-difluorophenyl)amine, bis(3,5-difluorophenyl)amine, bis(2,4,6-trifluorophenyl)amine, bis(3,4,5-trifluorophenyl)amine, bis(pentafluorophenyl)amine, bis(2-(trifluoromethyl)phenyl)amine, bis(3-(trifluoromethyl)phenyl)amine, bis(4-(trifluoromethyl)phenyl)amine bis(2,6-di(trifluoromethyl)phenyl)amine, bis(3,5-di(trifluoromethyl)phenyl)amine, bis(2,4,6-tri(trifluoromethyl)phenyl)amine, bis(2-cyanophenyl)amine, (3-cyanophenyl)amine, bis(4-cyanophenyl)amine, bis(2-nitrophenyl)amine, bis(3-nitrophenyl)amine, bis(4-nitrophenyl)amine, bis(1H,1H-perfluorobutyl)amine, bis(1H,1H-perfluoropentyl)amine, bis(1H,1H-perfluorohexyl)amine, bis(1H,1H-perfluorooctyl)amine, bis(1H,1H-perfluorododecyl)amine, bis(1H,1H-perfluoropentadecyl)amine, bis(1H,1H-perfluoroeicosyl)amine and the like. Further mentioned are amines obtained by changing fluoro in these amines into chloro, bromo or iodo.

As the phosphine, compounds obtained by changing a nitrogen atom in the above-described amines into a phosphorus atom are mentioned. These phosphines are compounds obtained by substituting amine in the above-described amines by phosphine.

The alcohol includes fluoromethanol, difluoromethanol, trifluoromethanol, 2,2,2-trifluoroethanol, 2,2,3,3,3-pentafluoropropanol, 2,2,2-trifluoro-1-trifluoromethylethanol, 1,1-bis(trifluoromethyl)-2,2,2-trifluoroethanol, 1H,1H-perfluorobutanol, 1H,1H-perfluoropentanol, 1H,1H-perfluorohexanol, 1H,1H-perfluorooctanol, 1H,1H-perfluorododecanol, 1H,1H-perfluoropentadecanol, 1H,1H-perfluoroeicosanol and the like. Further mentioned are alcohols obtained by changing fluoro in these alcohols into chloro, bromo or iodo.

As the thiol, compounds obtained by changing an oxygen atom in the above-described alcohols into a sulfur atom are mentioned. These thiols are compounds obtained by substituting nol in the above-described alcohols by nethiol.

The phenol includes 2-fluorophenol, 3-fluorophenol, 4-fluorophenol, 2,4-difluorophenol, 2,6-difluorophenol, 3,4-difluorophenol, 3,5-difluorophenol, 2,4,6-trifluorophenol, 3,4,5-trifluorophenol, 2,3,5,6-tetrafluorophenol, pentafluorophenol, 2,3,5,6-tetrafluoro-4-trifluoromethylphenol, 2,3,5,6-tetrafluoro-4-pentafluorophenylphenol and the like. Further mentioned are phenols obtained by changing fluoro in these phenols into chloro, bromo or iodo.

As the thiophenol, compounds obtained by changing an oxygen atom in the above-described phenols into a sulfur atom are mentioned. These thiophenols are compounds obtained by substituting phenol in the above-described phenols by thiophenol.

The naphthol includes perfluoro-1-naphthol, perfluoro-2-naphthol, 4,5,6,7,8-pentafluoro-2-naphthol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol, 2-cyanophenol, 3-cyanophenol, 4-cyanophenol, 2-nitrophenol, 3-nitrophenol, 4-nitrophenol and the like. Further mentioned are naphthols obtained by changing fluoro in these naphthols into chloro, bromo or iodo.

As the naphthylthiol, compounds obtained by changing an oxygen atom in the above-described naphthols into a sulfur atom are mentioned. These naphthylthiols are compounds obtained by substituting naphthol in the above-described naphthols by naphthylthiol.

Examples of the carboxylic acid compound include pentafluorobenzoic acid, perfluoroethanoic acid, perfluoropropanoic acid, perfluorobutanoic acid, perfluoropentanoic acid, perfluorohexanoic acid, perfluoroheptanoic acid, perfluorooctanoic acid, perfluorononanoic acid, perfluorodecanoic acid, perfluoroundecanoic acid, perfluorododecanoic acid and the like.

The compound of the general formula (6) as the component (b2) is preferably an amine, alcohol or phenol compound, and the amine is preferably bis(trifluoromethyl)amine, bis(2,2,2-trifluoroethyl)amine, bis(2,2,3,3,3-pentafluoropropyl)amine, bis(2,2,2-trifluoro-1-trifluoromethylethyl)amine, bis(1,1-bis(trifluoromethyl)-2,2,2-trifluoroethyl)amine or bis(pentafluorophenyl)amine, the alcohol is preferably trifluoromethanol, 2,2,2-trifluoroethanol, 2,2,3,3,3-pentafluoropropanol, 2,2,2-trifluoro-1-trifluoromethylethanol or 1,1-bis(trifluoromethyl)-2,2,2-trifluoroethanol, and the phenol is preferably 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol or 3,4,5-tris(trifluoromethyl)phenol.

The compound of the general formula (6) as the component (b2) is more preferably bis(trifluoromethyl)amine, bis(pentafluorophenyl)amine, trifluoromethanol, 2,2,2-trifluoro-1-trifluoromethylethanol, 1,1-bis(trifluoromethyl)-2,2,2-trifluoroethanol, 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 4-(trifluoromethyl)phenol, 2,6-bis(trifluoromethyl)phenol or 2,4,6-tris(trifluoromethyl)phenol, further preferably 3,5-difluorophenol, 3,4,5-trifluorophenol, pentafluorophenol or 1,1-bis(trifluoromethyl)-2,2,2-trifluoroethanol.

The compound of the general formula (7) as the component (b3) includes water, hydrogen sulfide, amine, aniline compound and the like.

The amine includes alkylamines such as methylamine, ethylamine, n-propylamine, isopropylamine, n-butylamine, sec-butylamine, tert-butylamine, isobutylamine, n-pentylamine, neopentylamine, isopentylamine, n-hexylamine, n-octylamine, n-decylamine, n-dodecylamine, n-pentadecylamine, n-eicosylamine and the like; aralkylamines such as benzylamine, (2-methylphenyl)methylamine, (3-methylphenyl)methylamine, (4-methylphenyl)methylamine, (2,3-dimethylphenyl)methylamine, (2,4-dimethylphenyl)methylamine, (2,5-dimethylphenyl)methylamine, (2,6-dimethylphenyl)methylamine, (3,4-dimethylphenyl)methylamine, (3,5-dimethylphenyl)methylamine, (2,3,4-trimethylphenyl)methylamine, (2,3,5-trimethylphenyl)methylamine, (2,3,6-trimethylphenyl)methylamine, (3,4,5-trimethylphenyl)methylamine, (2,4,6-trimethylphenyl)methylamine, (2,3,4,5-tetramethylphenyl)methylamine, (2,3,4,6-tetramethylphenyl)methylamine, (2,3,5,6-tetramethylphenyl)methylamine, (pentamethylphenyl)methylamine, (ethylphenyl)methylamine, (n-propylphenyl)methylamine, (isopropylphenyl)methylamine, (n-butylphenyl)methylamine, (sec-butylphenyl)methylamine, (tert-butylphenyl)methylamine, (n-pentylphenyl)methylamine, (neopentylphenyl)methylamine, (n-hexylphenyl)methylamine, (n-octylphenyl)methylamine, (n-decylphenyl)methylamine, (n-tetradecylphenyl)methylamine, naphthylmethylamine, anthracenylmethylamine and the like; arylamines; cyclopentadienylamines; and the like.

Further, the amine includes halogenated alkylamines such as fluoromethylamine, difluoromethylamine, trifluoromethylamine, 2,2,2-trifluoroethylamine, 2,2,3,3,3-pentafluoropropylamine, 2,2,2-trifluoro-1-trifluoromethylethylamine, 1,1-bis(trifluoromethyl)-2,2,2-trifluoroethylamine, perfluoropropylamine, perfluorobutylamine, perfluoropentylamine, perfluorohexylamine, perfluorooctylamine, perfluorododecylamine, perfluoropentadecylamine, perfluoroeicosylamine and the like. Further mentioned are amines obtained by changing fluoro in these amines into chloro, bromo or iodo.

The aniline compound includes aniline, naphthylamine, anthracenylamine, 2-methylaniline, 3-methylaniline, 4-methylaniline, 2,3-dimethylaniline, 2,4-dimethylaniline, 2,5-dimethylaniline, 2,6-dimethylaniline, 3,4-dimethylaniline, 3,5-dimethylaniline, 2,3,4-trimethylaniline, 2,3,5-trimethylaniline, 2,3,6-trimethylaniline, 2,4,6-trimethylaniline, 3,4,5-trimethylaniline, 2,3,4,5-tetramethylaniline, 2,3,4,6-tetramethylaniline, 2,3,5,6-tetramethylaniline, pentamethylaniline, 2-ethylaniline, 3-ethylaniline, 4-ethylaniline, 2,3-diethylaniline, 2,4-diethylaniline, 2,5-diethylaniline, 2,6-diethylaniline, 3,4-diethylaniline, 3,5-diethylaniline, 2,3,4-triethylaniline, 2,3,5-triethylaniline, 2,3,6-triethylaniline, 2,4,6-triethylaniline, 3,4,5-triethylaniline, 2,3,4,5-tetraethylaniline, 2,3,4,6-tetraethylaniline, 2,3,5,6-tetraethylaniline, pentaethylaniline and the like. Further mentioned are aniline compounds obtained by changing ethyl in these aniline compounds into n-propyl, isopropyl, n-butyl, sec-butyl, tert-butyl, n-pentyl, neopentyl, n-hexyl, n-octyl, n-decyl, n-dodecyl, n-tetradecyl and the like.

The aniline compound includes 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-di(trifluoromethyl)aniline, 3,5-di(trifluoromethyl)aniline, 2,4,6-tri(trifluoromethyl)aniline, 3,4,5-tri(trifluoromethyl)aniline and the like. Further mentioned are aniline compounds obtained by changing fluoro in these aniline compounds into chloro, bromo, iodo and the like.

The compound of the general formula (7) as the component (b3) is preferably water, hydrogen sulfide, methylamine, ethylamine, n-propylamine, isopropylamine, n-butylamine, sec-butylamine, tert-butylamine, isobutylamine, n-octylamine, aniline, 2,6-dimethylaniline, 2,4,6-trimethylaniline, naphthylamine, anthracenylamine, benzylamine, trifluoromethylamine, pentafluoroethylamine, perfluoropropylamine, perfluorobutylamine, perfluoropentylamine, perfluorohexylamine, perfluorooctylamine, perfluorododecylamine, perfluoropentadecylamine, perfluoroeicosylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-bis(trifluoromethyl)aniline, 3,5-bis(trifluoromethyl)aniline, 2,4,6-tris(trifluoromethyl)aniline or 3,4,5-tris(trifluoromethyl)aniline, particularly preferably water, trifluoromethylamine, perfluorobutylamine, perfluorooctylamine, perfluoropentadecylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-bis(trifluoromethyl)aniline, 3,5-bis(trifluoromethyl)aniline, 2,4,6-tris(trifluoromethyl)aniline or 3,4,5-tris(trifluoromethyl)aniline, and most preferably water or pentafluoroaniline.

As the particulate carrier as the component (b4), solvents for preparation of polymerization catalysts or solid substances insoluble in a polymerization solvent are suitably used, porous substances are more suitably used, inorganic substances or organic polymers are further suitably used, and inorganic substances are particularly suitably used.

The particulate carrier as the component (b4) is preferably a carrier having uniform particle size, and the volume-based geometric standard deviation of the particle size of the particulate carrier as the component (b4) is preferably 2.5 or less, more preferably 2.0 or less, and further preferably 1.7 or less.

As the inorganic substance as the particulate carrier as the component (b4), inorganic oxides, clays, clay minerals and the like are mentioned. Some of them may also be used in admixture.

The inorganic oxide includes $SiO_2$, $Al_2O_3$, MgO, $ZrO_2$, $TiO_2$, $B_2O_3$, CaO, ZnO, BaO, $ThO_2$, $SiO_2$—MgO, $SiO_2$—$Al_2O_3$, $SiO_2$—$TiO_2$, $SiO_2$—$V_2O_5$, $SiO_2$—$Cr_2O_3$, $SiO_2$—$TiO_2$—MgO, and mixtures composed of two or more of them. Of these inorganic oxides, $SiO_2$ and/or $Al_2O_3$ is preferable, and particularly, $SiO_2$ (silica) is preferable. The above-described inorganic oxides may contain a small amount of carbonate, sulfate, nitrate or oxide components such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, $Li_2O$ and the like.

Though a hydroxyl group is usually generated and present on the surface of the inorganic oxide, modified inorganic oxides obtained by substituting active hydrogen of the surface hydroxyl group by various substituents may also be used as the inorganic oxide. Examples of the modified inorganic oxide include inorganic oxides brought into contact with a trialkylchlorosilane such as trimethylchlorosilane, tert-butyldimethylchlorosilane and the like; a triarylchlorosilane such as triphenylchlorosilane and the like; a dialkyldichlorosilane such as dimethyldichlorosilane and the like; a diaryldichlorosilane such as diphenyldichlorosilane and the like; an alkyltrichlorosilane such as methyltrichlorosilane and the like; an aryltrichlorosilane such as phenyltrichlorosilane and the like; a trialkylalkoxysilane such as trimethylmethoxysilane and the like; a triarylalkoxysilane such as triphenylmethoxysilane and the like; a dialkyldialkoxysilane such as dimethyldimethoxysilane and the like; a diaryldialkoxysilane such as diphenyldimethoxysilane and the like; an alkyltrialkoxysilane such as methyltrimethoxysilane and the like; an aryltrialkoxysilane such as phenyltrimethoxysilane and the like; a tetraalkoxysilane such as tetramethoxysilane and the like; an alkyldisilazane such as 1,1,1,3,3,3-hexamethyldisilazane and the like; tetrachlorosilane; an alcohol such as methanol, ethanol and the like; phenol; a dialkylmagnesium such as dibutylmagnesium, butylethylmagnesium, butyloctylmagnesium and the like; an alkyllithium such as butyllithium and the like, etc.

Further exemplified are inorganic oxides obtained by contacting with a dialkylamine such as diethylamine, diphenylamine and the like, an alcohol such as methanol, ethanol and the like, or phenol, after contacting with a trialkylaluminum.

In some cases, hydroxyl groups in an inorganic oxide are mutually hydrogen-bonded to enhance the strength of the inorganic oxide itself. In this case, if all active hydrogens of surface hydroxyl groups are substituted by various substituents, lowering of the particle strength and the like occur in some cases. Therefore, it is not necessarily required to substitute all active hydrogens of surface hydroxyl groups on an inorganic oxide, and the substitution ratio of surface hydroxyl groups may be appropriately determined. The method of changing the substitution ratio of surface hydroxyl groups is not particularly restricted. As this method, for example, a method of varying the use amount of a compound to be used for contacting is exemplified.

The clay or clay mineral includes kaolin, bentonite, kibushi-clay, gairome clay, allophane, hisingerite, bairofiraito, talc, micas, smectite, montmorillonites, hectorite, laponite, vermiculite, chlorites, palygorskite, kaolinite, nacrite, dickite, halloysite and the like. Of them, preferable are smectite, montmorillonite, hectorite, laponite and saponite, further preferable are montmorillonite and hectorite.

As the inorganic substance, inorganic oxides are suitably used. It is preferable that the inorganic substance is dried to substantially remove water, and those dried by a heating treatment are preferable. The heating treatment is carried out at a temperature of 100 to 1500° C., preferably 100 to 1000° C., further preferably 200 to 800° C., usually, for an inorganic substance of which water content cannot be visually confirmed. The heating time is preferably 10 minutes to 50 hours, more preferably 1 hour to 30 hours. The heat dry method includes a method in which a dried inert gas (for example, nitrogen, argon or the like) is allowed to flow at a constant flow rate during heating, thereby attaining drying, a method in which heating and pressure-reducing is carried out under reduced pressure, and other methods.

The average particle size of the inorganic substance is usually 1 to 5000 μm, preferably 5 to 1000 μm, more preferably 10 to 500 μm, and further preferably 10 to 100 μm. The pore volume is preferably 0.1 ml/g or more, more preferably 0.3 to 10 ml/g. The specific surface area is preferably 10 to 1000 m²/g, more preferably 100 to 500 m²/g.

As the organic polymer as the particulate carrier as the component (b4), preferable are polymers having a functional group carrying active hydrogen or a non-proton-donating Lewis basic functional group.

The functional group carrying active hydrogen includes a primary amino group, secondary amino group, imino group, amide group, hydrazide group, amidino group, hydroxy group, hydroperoxy group, carboxyl group, formyl group, carbamoyl group, sulfonic group, sulfinic group, sulfenic group, thiol group, thioformyl group, pyrrolyl group, imidazolyl group, piperidyl group, indazolyl group, carbazolyl group and the like. Preferable is a primary amino group, secondary amino group, imino group, amide group, imide group, hydroxy group, formyl group, carboxyl group, sulfonic group or thiol group. Particularly preferable is a primary amino group, secondary amino group, amide group or hydroxy group. These groups may have substitution by a halogen atom or a hydrocarbyl group having 1 to 20 carbon atoms.

The non-proton-donating Lewis basic functional group is a functional group having a Lewis base portion having no active hydrogen atom, and includes a pyridyl group, N-substituted imidazolyl group, N-substituted indazolyl group, nitrile group, azide group, N-substituted imino group, N,N-substituted amino group, N,N-substituted aminooxy group, N,N,N-substituted hydrazino group, nitroso group, nitro group, nitrooxy group, furyl group, carbonyl group, thiocarbonyl group, alkoxy group, alkyloxycarbonyl group, N,N-substituted carbamoyl group, thioalkoxy group, substituted sulfinyl group, substituted sulfonyl group, substituted sulfonic group and the like. Preferable are heterocyclic groups, and further preferable are aromatic heterocyclic groups having an oxygen atom and/or nitrogen atom in the ring. Particularly preferable are a pyridyl group, N-substituted imidazolyl group and N-substituted indazolyl group, and most preferable is a pyridyl group. These groups may be substituted by a halogen atom or a hydrocarbyl group having 1 to 20 carbon atoms.

In the organic polymer, the content of the functional group carrying active hydrogen or the non-proton-donating Lewis basic functional group is preferably 0.01 to 50 mmol/g and more preferably 0.1 to 20 mmol/g, in terms of the molar quantity of the functional group per unit gram of a polymer constituting the organic polymer.

As the method of producing a polymer having the functional group carrying active hydrogen or the non-proton-donating Lewis basic functional group described above, there are mentioned, for example, a method in which a monomer having the functional group carrying active hydrogen or the non-proton-donating Lewis basic functional group and at least one polymerizable unsaturated group is homopolymerized, and a method in which this monomer and other monomer having a polymerizable unsaturated group are copolymerized. In this case, it is preferable that, further, a crosslink-polymerizable monomer having two or more polymerizable unsaturated groups is also copolymerized together.

The above-described polymerizable unsaturated group includes alkenyl groups such as a vinyl group, allyl group and the like; alkynyl groups such as an ethyne group and the like.

The monomer having the functional group carrying active hydrogen and at least one polymerizable unsaturated group includes a vinyl group-containing primary amine, vinyl group-containing secondary amine, vinyl group-containing amide compound, vinyl group-containing hydroxy compound and the like. Specific examples of the monomer include N-(1-ethenyl)amine, N-(2-propenyl)amine, N-(1-ethenyl)-N-methylamine, N-(2-propenyl)-N-methylamine, 1-ethenylamide, 2-propenylamide, N-methyl(1-ethenyl)amide, N-methyl(2-propenyl)amide, vinylalcohol, 2-propen-1-ol, 3-buten-1-ol and the like.

The monomer having the functional group having a Lewis base portion having no active hydrogen atom and at least one polymerizable unsaturated group includes vinylpyridine, vinyl (N-substituted) imidazole, vinyl (N-substituted) indazole and the like.

Examples of the other monomer having a polymerizable unsaturated group include ethylene, α-olefin, aromatic vinyl compound, cyclic olefin and the like. Specific examples of the monomer include ethylene, propylene, 1-butene, 1-hexene, 4-methyl-1-pentene, styrene, norbornene and dicyclopentadiene. These monomers may be used in combination. Preferable are ethylene and styrene. As the crosslink-polymerizable monomer having two or more polymerizable unsaturated groups, divinylbenzene and the like are mentioned.

The average particle size of the organic polymer is usually 1 to 5000 μm, preferably 5 to 1000 μm, and more preferably 10 to 500 μm. The pore volume thereof is preferably 0.1 ml/g or more, and more preferably 0.3 to 10 ml/g. The specific surface area thereof is preferably 10 to 1000 m²/g, and more preferably 50 to 500 m²/g.

It is preferable that the organic polymer is dried to substantially remove water, and those dried by a heating treatment are preferable. The heating treatment temperature is usually 30 to 400° C., preferably 50 to 200° C., further preferably 70 to 150° C., for an organic polymer of which water content cannot be visually confirmed. The heating time is preferably 10 minutes to 50 hours, more preferably 1 hour to 30 hours. The heat dry method includes a method in which a dried inert gas (for example, nitrogen, argon or the like) is allowed to flow at a constant flow rate during heating, thereby attaining drying, a method in which drying with heating is carried out under reduced pressure, and other methods.

The cocatalyst component (B) is formed by contact of the component (b1), component (b2), component (b3) and component (b4). The order of contact of the component (b1), component (b2), component (b3) and component (b4)) includes the following orders.

<1> The component (b1) and the component (b2) are brought into contact, a contacted substance obtained by this contact and the component (b3) are brought into contact, and a contacted substance obtained by this contact and the component (b4) are brought into contact.

<2> The component (b1) and the component (b2) are brought into contact, a contacted substance obtained by this contact and the component (b4) are brought into contact, and a contacted substance obtained by this contact and the component (b3) are brought into contact.

<3> The component (b1) and the component (b3) are brought into contact, a contacted substance obtained by this contact and the component (b2) are brought into contact, and a contacted substance obtained by this contact and the component (b4) are brought into contact.

<4> The component (b1) and the component (b3) are brought into contact, a contacted substance obtained by this contact and the component (b4) are brought into contact, and a contacted substance obtained by this contact and the component (b2) are brought into contact.

<5> The component (b1) and the component (b4) are brought into contact, a contacted substance obtained by this contact and the component (b2) are brought into contact, and a contacted substance obtained by this contact and the component (b3) are brought into contact.

<6> The component (b1) and the component (b4) are brought into contact, a contacted substance obtained by this contact and the component (b3) are brought into contact, and a contacted substance obtained by this contact and the component (b2) are brought into contact.

<7> The component (b2) and the component (b3) are brought into contact, a contacted substance obtained by this contact and the component (b1) are brought into contact, and a contacted substance obtained by this contact and the component (b4) are brought into contact.

<8> The component (b2) and the component (b3) are brought into contact, a contacted substance obtained by this contact and the component (b4) are brought into contact, and a contacted substance obtained by this contact and the component (b1) are brought into contact.

<9> The component (b2) and the component (b4) are brought into contact, a contacted substance obtained by this contact and the component (b1) are brought into contact, and a contacted substance obtained by this contact and the component (b3) are brought into contact.

<10> The component (b2) and the component (b4) are brought into contact, a contacted substance obtained by this contact and the component (b3) are brought into contact, and a contacted substance obtained by this contact and the component (b1) are brought into contact.

<11> The component (b3) and the component (b4) are brought into contact, a contacted substance obtained by this contact and the component (b1) are brought into contact, and a contacted substance obtained by this contact and the component (b2) are brought into contact.

<12> The component (b3) and the component (b4) are brought into contact, a contacted substance obtained by this contact and the component (b2) are brought into contact, and a contacted substance obtained by this contact and the component (b1) are brought into contact.

Contact with the component (b1), component (b2), component (b3) and component (b4) is preferably carried out under an inert gas atmosphere. The contact temperature is usually −100 to 300° C., preferably −80 to 200° C. The contact time is usually 1 minute to 200 hours, preferably 10 minutes to 100 hours. A solvent may be used in contact thereof, or these compounds may be directly brought into contact using no solvent.

In the case of use of a solvent, those not reacting with the component (b1), component (b2), component (b3) and component (b4) and contacted substances thereof are used. However, when the components are brought into contact in a stepwise fashion as described above, even a solvent reacting with a certain component in a certain stage can be used in other stages providing that it does not react with components in the other stages. That is, solvents in respective stages are mutually the same or different. Examples of the solvent include nonpolar solvents such as aliphatic hydrocarbon solvents, aromatic hydrocarbon solvents and the like; and polar solvents such as halide solvents, ether solvents, alcohol solvents, phenol solvents, carbonyl solvents, phosphoric acid derivatives, nitrile solvents, nitro compounds, amine solvents, sulfur compounds and the like. Specific examples thereof include aliphatic hydrocarbon solvents such as butane, pentane, hexane, heptane, octane, 2,2,4-trimethylpentane, cyclohexane and the like; aromatic hydrocarbon solvents such as benzene, toluene, xylene and the like; halide solvents such as dichloromethane, difluoromethane, chloroform, 1,2-dichloroethane, 1,2-dibromoethane, 1,1,2-trichloro-1,2,2-trifluoroethane, tetrachloroethylene, chlorobenzene, bromobenzene, o-dichlorobenzene and the like; ether solvents such as dimethyl ether, diethyl ether, diisopropyl ether, di-n-butyl ether, methyl-tert-butyl ether, anisole, 1,4-dioxane, 1,2-dimethoxyethane, bis(2-methoxyethyl) ether, tetrahydrofuran, tetrahydropyran and the like; alcohol solvents such as methanol, ethanol, 1-propanol, 2-propanol, 1-butanol, 2-butanol, 2-methyl-1-propanol, 3-methyl-1-butanol, cyclohexanol, benzylalcohol, ethylene glycol, propylene glycol, 2-methoxyethanol, 2-ethoxyethanol, diethylene glycol, triethylene glycol, glycerin and the like; phenol solvents such as phenol, p-cresol and the like; carbonyl solvents such as acetone, ethyl methyl ketone, cyclohexanone, acetic anhydride, ethyl acetate, butyl acetate, ethylene carbonate, propylene carbonate, N,N-dimethylformamide, N,N-dimethylacetamide, N-methyl-2-pyrrolidone and the like; phosphoric acid derivatives such as hexamethylphosphoric triamide, triethyl phosphate and the like; nitrile solvents such as acetonitrile, propionitrile, succinonitrile, benzonitrile and the like; nitro compounds such as nitromethane, nitrobenzene and the like; amine solvents such as pyridine, piperidine, morpholine and the like; sulfur compounds such as dimethyl sulfoxide, sulfolane and the like.

When a contacted substance (c) obtained by contact of the component (b1), component (b2) and component (b3) is brought into contact with the component (b4), namely in the above-described methods <1>, <3> and <7>, preferable as the solvent (s1) used in the case of production of the contacted substance (c) are the above-described aliphatic hydrocarbon solvents, aromatic hydrocarbon solvents and ether solvents.

In contrast, preferable as the solvent (s2) used in the case of contact of the contacted substance (c) and the component (b4) are polar solvents. As the index showing the polarity of a solvent, $E_T^N$ value (C. Reichardt, "Solvents and Solvents Effects in Organic Chemistry", 2nd ed., VCH Verlag (1988).) and the like are known, and solvents satisfying the range of $0.8 \geq E_T^N \geq 0.1$ are particularly preferable.

Examples of such polar solvents include dichloromethane, dichlorodifluoromethanechloroform, 1,2-dichloroethane, 1,2-dibromoethane, 1,1,2-trichloro-1,2,2-trifluoroethane, tetrachloroethylene, chlorobenzene, bromobenzene, o-dichlorobenzene, dimethyl ether, diethyl ether, diisopropyl ether, di-n-butyl ether, methyltert-butyl ether, anisole, 1,4-dioxane, 1,2-dimethoxyethane, bis(2-methoxyethyl) ether, tetrahydrofuran, tetrahydropyran, methanol, ethanol, 1-propanol, 2-propanol, 1-butanol, 2-butanol, 2-methyl-1-propanol, 3-methyl-1-butanol, cyclohexanol, benzylalcohol, ethylene glycol, propylene glycol, 2-methoxyethanol, 2-ethoxyethanol, diethylene glycol, triethylene glycol, acetone, ethyl methyl ketone, cyclohexanone, acetic anhydride, ethyl acetate, butyl acetate, ethylene carbonate, propylene carbonate, N,N-dimethylformamide, N,N-dimethylacetamide, N-methyl-2-pyrrolidone, hexamethylphosphoric triamide, triethyl phosphate, acetonitrile, propionitrile, succinonitrile, benzonitrile, nitromethane, nitrobenzene, ethylenediamine, pyridine, piperidine, morpholine, dimethyl sulfoxide, sulfolane and the like.

The solvent (s2) includes further preferably dimethyl ether, diethyl ether, diisopropyl ether, di-n-butyl ether, methyl-tert-butyl ether, anisole, 1,4-dioxane, 1,2-dimethoxyethane, bis(2-methoxyethyl) ether, tetrahydrofuran, tetrahydropyran, methanol, ethanol, 1-propanol, 2-propanol, 1-butanol, 2-butanol, 2-methyl-1-propanol, 3-methyl-1-butanol, cyclohexanol, benzylalcohol, ethylene glycol, propylene glycol, 2-methoxyethanol, 2-ethoxyethanol, diethylene glycol, triethylene glycol, particularly preferably, di-n-butyl ether, methyl-tert-butyl ether, 1,4-dioxane, tetrahydrofuran, methanol, ethanol, 1-propanol, 2-propanol, 1-butanol, 2-butanol, 2-methyl-1-propanol, 3-methyl-1-butanol and cyclohexanol, most preferably, tetrahydrofuran, methanol, ethanol, 1-propanol and 2-propanol.

As the above-described solvent (s2), mixed solvents of these polar solvents and hydrocarbon solvents can be used. As the hydrocarbon solvent, compounds exemplified as the aliphatic hydrocarbon solvents and aromatic hydrocarbon solvents are used. Examples of the mixed solvents of polar solvents and hydrocarbon solvents include a hexane/methanol mixed solvent, hexane/ethanol mixed solvent, hexane/1-propanol mixed solvent, hexane/2-propanol mixed solvent, heptane/methanol mixed solvent, heptane/ethanol mixed solvent, heptane/1-propanol mixed solvent, heptane/2-propanol mixed solvent, toluene/methanol mixed solvent, toluene/ethanol mixed solvent, toluene/1-propanol mixed solvent, toluene/2-propanol mixed solvent, xylene/methanol mixed solvent, xylene/ethanol mixed solvent, xylene/1-propanol mixed solvent, xylene/2-propanol mixed solvent and the like. Preferable are a hexane/methanol mixed solvent, hexane/ethanol mixed solvent, heptane/methanol mixed solvent, heptane/ethanol mixed solvent, toluene/methanol mixed solvent, toluene/ethanol mixed solvent, xylene/methanol mixed solvent and xylene/ethanol mixed solvent. Further preferable are a hexane/methanol mixed solvent, hexane/ethanol mixed solvent, toluene/methanol mixed solvent and toluene/ethanol mixed solvent. Most preferable is a toluene/ethanol mixed solvent. In a toluene/ethanol mixed solvent, the ethanol fraction is preferably in the range of 10 to 50% by volume, further preferably 15 to 30% by volume.

When a contacted substance (c) obtained by contact of the component (b1), component (b2) and component (b3) is brought into contact with the component (b4), namely in the above-described methods <1>, <3> and <7>, hydrocarbon solvents can also be used as both the solvent (s1) and the solvent (s2). In this case, it is preferable that time from contact of the component (b1), component (b2) and component (b3) until contact of the resultant contacted substance (c) and the component (b4) is shorter. This time is preferably 0 to 5 hours, further preferably 0 to 3 hours, and most preferably 0 to 1 hour. The temperature for contact of the contacted substance (c) and the component (b4) is usually −100° C. to 40° C., preferably −20° C. to 20° C., and most preferably −10° C. to 10° C.

In the above-described cases <2>, <5>, <6>, <8>, <9>, <10>, <11> and <12>, any of the above-described nonpolar solvents and polar solvents can be used. The nonpolar solvents are preferable. The reason for this is believed as follows: since a contacted substance of the component (b1) and the component (b3), and a contacted substance obtained by contact of a contacted substance of the component (b1) and the component (b2) with the component (b3) are in general poorly soluble in a nonpolar solvent, when the component (b4) is present in the reaction system in production of these contacted substances, the contacted substances deposit on the surface of the component (b4), thereby giving fixation tendency thereof.

It is preferable that the use amounts of the component (b2) and the component (b3) per mol of the use amount of the component (b1) satisfy the following relational formula (V).

$$|\text{atomic valence of } M^3 - \text{molar quantity of component (b2)} - 2 \times \text{molar quantity of component (b3)}| \leq 1 \quad (V)$$

The use amount of the component (b2) per mol of the use amount of the component (b1) is preferably 0.01 to 1.99 mol, more preferably 0.1 to 1.8 mol, further preferably 0.2 to 1.5 mol, and most preferably 0.3 to 1 mol. The preferable use amount, more preferable use amount, further preferable use amount and most preferable use amount of the component (b3) per mol of the use amount of the component (b1) are calculated based on the atomic valence of $M^3$, the use amount of the component (b2) per mol of the use amount of the above-described component (b1) and the above-described relational formula (V), respectively.

The use amounts of the component (b1) and the component (b2) are regulated so that the amount of metal atoms derived from the component (b1) contained in the component (B) is preferably 0.1 mmol or more, more preferably 0.5 to 20 mmol, in terms of the mole number of metal atoms contained per g of the cocatalyst component (B).

For progressing the reaction more quickly, a heating process at higher temperature may be added after the contact as described above. In the heating process, it is preferable to use a solvent having higher boiling point for attaining higher temperature, and in carrying out the heating process, the solvent used in the contact may be substituted by other solvent having higher boiling point.

In the cocatalyst component (B), the component (b1), component (b2), component (b3) and/or component (b4) as raw materials may remain as unreacted substances as a result of such contact, however, it is preferable to previously perform a washing treatment for removing unreacted substances. The solvent used in this procedure may be the same as or different from the solvent used in the contact. Such a washing treatment is preferably carried out under an inert gas atmosphere. The contact temperature is usually −100 to 300° C., preferably −80 to 200° C. The contact time is usually 1 minute to 200 hours, preferably 10 minutes to 100 hours.

After such contact and washing treatment, it is preferable to distill off the solvent from the product, then, to perform drying at a temperature of 0° C. or higher under reduced pressure for 1 hour to 24 hours. It is carried out more preferably at a temperature of 0° C. to 200° C. for 1 hour to 24 hours, further preferably at a temperature of 10° C. to 200° C. for 1 hour to 24 hours, particularly preferably at a temperature of 10° C. to 160° C. for 2 hours to 18 hours, and most preferably at a temperature of 15° C. to 160° C. for 4 hours to 18 hours.

To total use amount of the transition metal compound (A1) and the transition metal compound (A2) is usually 1 to 10000 μmol/g, preferably 10 to 1000 μmol/g, and more preferably 20 to 500 μmol/g, per g of the cocatalyst component (B).

In preparation of the polymerization catalyst, an organoaluminum compound (C) may also be contacted, in addition to the transition metal compound (A1), the transition metal compound (A2) and the cocatalyst component (B). The use amount of the organoaluminum compound (C) is preferably 0.1 to 1000, more preferably 0.5 to 500 and further preferably 1 to 100, in terms of mole number of aluminum atoms in the organoaluminum compound (C) per mol of the sum of the transition metal compound (A1) and the transition metal compound (A2).

The organoaluminum compound (C) includes trialkylaluminums such as trimethylaluminum, triethylaluminum, tri-n-propylaluminum, tri-n-butylaluminum, triisobutylaluminum, tri-n-hexylaluminum, tri-n-octylaluminum and the like; dialkylaluminum chlorides such as dimethylaluminum chloride, diethylaluminum chloride, di-n-propylaluminum chloride, di-n-butylaluminum chloride, diisobutylaluminum chloride, di-n-hexylaluminum chloride and the like; alkylaluminum dichlorides such as methylaluminum dichloride, ethylaluminum dichloride, n-propylaluminum dichloride, n-butylaluminum dichloride, isobutylaluminum dichloride, n-hexylaluminum dichloride and the like; dialkylaluminum hydrides such as dimethylaluminum hydride, diethylaluminum hydride, di-n-propylaluminum hydride, di-n-butylaluminum hydride, diisobutylaluminum hydride, di-n-hexylaluminum hydride and the like; alkyl(dialkoxy)aluminums such as methyl(dimethoxy)aluminum, methyl(diethoxy)aluminum, methyl(di-tert-butoxy)aluminum and the like; dialkyl(alkoxy)aluminums such as dimethyl(methoxy)aluminum, dimethyl(ethoxy)aluminum, methyl(tert-butoxy)aluminum and the like; alkyl(diaryloxy)aluminums such as methyl(diphenoxy)aluminum, methylbis(2,6-diisopropylphenoxy)aluminum, methylbis(2,6-diphenylphenoxy)aluminum and the like; dialkyl(aryloxy)aluminums such as dimethyl(phenoxy)aluminum, dimethyl(2,6-diisopropylphenoxy)aluminum, dimethyl(2,6-diphenylphenoxy)aluminum and the like; etc. These organoaluminum compounds may be used singly or in combination of two or more.

The organoaluminum compound (C) is preferably a trialkylaluminum, more preferably trimethylaluminum, triethylaluminum, tri-n-butylaluminum, triisobutylaluminum, tri-n-hexylaluminum or tri-n-octylaluminum, further preferably triisobutylaluminum or tri-n-octylaluminum.

In preparation of the polymerization catalyst, an electron donative compound (D) may be brought into contact, in addition to the transition metal compound (A1), the transition metal compound (A2) and the cocatalyst component (B). The use amount of the electron donative compound (D) is preferably 0.01 to 100, more preferably 0.1 to 50 and further preferably 0.25 to 5, in terms of the mole number of the electron donative compound (D) per mol the sum of the transition metal compound (A1) and the transition metal compound (A2)

The electron donative compound (D) includes triethylamine and tri-n-octylamine.

Contact of the transition metal compound (A1), the transition metal compound (A2) and the cocatalyst component (B), and if necessary, the organoaluminum compound (C) and the electron donative compound (D), is preferably carried out under an inert gas atmosphere. The contact temperature is usually −100 to 300° C., preferably −80 to 200° C. The contact time is usually 1 minute to 200 hours, preferably 30 minutes to 100 hours. It may also be permissible that components are separately charged into polymerization reaction tanks, and brought into contact in a polymerization reaction vessel.

The method of producing the ethylene-α-olefin copolymer of the present invention includes methods of copolymerizing ethylene and an α-olefin by a gas phase polymerization method, slurry polymerization method, bulk polymerization method and the like. A gas phase polymerization method is preferable, and a continuous gas phase polymerization method is more preferable. The gas phase polymerization reaction apparatus to be used in the polymerization method is usually an apparatus having a fluidized bed type reaction tank, and preferably an apparatus having a fluidized bed type reaction tank having an enlarged part. A stirring blade may also be installed in the reaction tank.

As the method of feeding the polymerization catalyst and various catalyst components to a polymerization reaction bath, a method of feeding under anhydrous state using an inert gas such as nitrogen, argon and the like, and hydrogen, ethylene and the like, and a method in which components are dissolved in or diluted with a solvent and fed in the form of solution or slurry, are usually used.

In the case of gas phase polymerization of ethylene and an α-olefin, the polymerization temperature is usually lower than the temperature at which the ethylene-α-olefin copolymer is melted, and preferably 0 to 150° C., more preferably 30 to 100° C. In the polymerization reaction tank, an inert gas may be introduced, and hydrogen may be introduced as a molecular weight modifier. Further, an organoaluminum compound (C) and an electron donative compound (D) may also be introduced.

The α-olefin to be used for polymerization include α-olefins having 3 to 20 carbon atoms such as propylene, 1-butene, 1-pentene, 1-hexene, 1-heptene, 1-octene, 1-nonene, 1-decene, 1-dodecene, 4-methyl-1-pentene, 4-methyl-1-hexene and the like. These may be used singly or in combination of two or more. Preferable are 1-butene, 1-hexene, 4-methyl-1-pentene and 1-octene. The combination of ethylene and an α-olefin includes ethylene/1-butene, ethylene/1-hexene, ethylene/4-methyl-1-pentene, ethylene/1-octene, ethylene/1-butene/1-hexene, ethylene/1-butene/4-methyl-1-pentene, ethylene/1-butene/1-octene, ethylene/1-hexene/1-octene and the like, preferably ethylene/1-hexene, ethylene/4-methyl-1-pentene, ethylene/1-butene/1-hexene, ethylene/1-butene/1-octene and ethylene/1-hexene/1-octene.

In copolymerization of ethylene and an α-olefin, if necessary, other monomers may be introduced into a polymerization reaction tank, and may be copolymerized in the range not deteriorating the effect of the present invention. The other monomers include a diolefin, cyclic olefin, alkenylaromatic hydrocarbon, α,β-unsaturated carboxylic acid and the like.

Specific examples thereof include diolefins such as 1,5-hexadiene, 1,4-hexadiene, 1,4-pentadiene, 1,7-octadiene, 1,8-nonadiene, 1,9-decadiene, 4-methyl-1,4-hexadiene, 5-methyl-1,4-hexadiene, 7-methyl-1,6-octadiene, 5-ethylidene-2-norbornene, dicyclopentadiene, 5-vinyl-2-norbornene, 5-methyl-2-norbornene, norbornadiene, 5-methylene-2-norbornene, 1,5-cyclooctadiene, 5,8-endomethylenehexahydronaphthalene, 1,3-butadiene, isoprene, 1,3-hexadiene, 1,3-octadiene, 1,3-cyclooctadiene, 1,3-cyclohexadiene and the like; cyclic olefins such as cyclopentene, cyclohexene, norbornene, 5-methylnorbornene, 5-ethylnorbornene, 5-butylnorbornene, 5-phenylnorbornene, 5-benzylnorbornene, tetracyclododecene, tricyclodecene, tricycloundecene, pentacyclopentadecene, pentacyclohexadecene, 8-methyltetracyclododecene, 8-ethyltetracyclododecene, 5-acetylnorbornene, 5-acetyloxynorbornene, 5-methoxycarbonylnorbornene, 5-ethoxycarbonylnorbornene, 5-methyl-5-methoxycarbonylnorbornene, 5-cyanonorbornene, 8-methoxycarbonyltetracyclododecene, 8-methyl-8-tetracyclododecene, 8-cyanotetracyclododecene and the like; alkenylaromatic hydrocarbons such as alkenylbenzenes such as styrene, 2-phenylpropylene, 2-phenylbutene, 3-phenylpropylene and the like, alkylstyrenes such as p-methylstyrene, m-methylstyrene, o-methylstyrene, p-ethylstyrene, m-ethylstyrene, o-ethylstyrene, 2,4-dimethylstyrene, 2,5-dimethylstyrene, 3,4-dimethylstyrene, 3,5-dimethylstyrene, 3-methyl-5-ethylstyrene, p-tertiary butylstyrene, p-secondary butylstyrene and the like, bisalkenylbenzenes such as divinylbenzene and the like, alkenylnaphthalenes such as 1-vinylnaphthalene and the like; α,β-unsaturated carboxylic acids such as acrylic acid, methacrylic acid, fumaric acid, maleic anhydride, itaconic acid, itaconic anhydride, bicyclo(2,2,1)-5-heptene-2,3-dicarboxylic acid and the like; salts of α,β-unsaturated carboxylic acids with a metal such as sodium, potassium, lithium, zinc, magnesium, calcium and the like; α,β-unsaturated carboxylic acid alkyl esters such as methyl acrylate, ethyl acrylate, n-propyl acrylate, isopropyl acrylate, t-butyl acrylate, 2-ethylhexyl acrylate, methyl methacrylate, ethyl methacrylate, n-propyl methacrylate, isopropyl methacrylate, n-butyl methacrylate, isobutyl methacrylate and the like; unsaturated dicarboxylic acids such as maleic acid, itaconic acid and the like; vinyl esters such as vinyl acetate, vinyl propionate, vinyl caproate, vinyl caprate, vinyl laurate, vinyl stearate, vinyl trifluoroacetate and the like; unsaturated carboxylic acid glycidyl esters such as glycidyl acrylate, glycidyl methacrylate, itaconic acid monoglycidyl ester and the like; etc.

As the method of producing the ethylene-α-olefin copolymer of the present invention, preferable is a method of copolymerizing ethylene and an α-olefin with use, as a polymerization catalyst component or polymerization catalyst, of a prepolymerized solid component obtained by polymerizing a small amount of olefin (hereinafter, referred to as prepolymerization), using the transition metal compound (A1) and the transition metal compound (A2) and the cocatalyst component (B), and if necessary, further, the organoaluminum compound (C) and the electron donating compound (D).

The olefin to be used in prepolymerization includes ethylene, propylene, 1-butene, 1-pentene, 1-hexene, 1-octene, 4-methyl-1-pentene, cyclopentene, cyclohexene and the like. These can be used singly or in combination of two or more. Preferably, ethylene is singly used or ethylene and an α-olefin are used together, further preferably, ethylene is singly used or ethylene and at least one α-olefin selected from 1-butene, 1-hexene and 1-octene are used together.

The content of the prepolymerized polymer in the prepolymerized solid component is preferably 0.01 to 1000 g, more preferably 0.05 to 500 g and further preferably 0.1 to 200 g per gram of the co-catalyst component (B).

The method of prepolymerization may be continuous or batch-wise, and examples thereof include a batch-wise slurry polymerization method, continuous slurry polymerization method and continuous gas phase polymerization method. As the method of charging the transition metal compound (A1) and the transition metal compound (A2) and the cocatalyst component (B), and if necessary, further, the organoaluminum compound (C) and the electron donating compound (D) into a polymerization reaction tank for carrying out prepolymerization, a method of charging under anhydrous state using an inert gas such as nitrogen, argon and the like, and hydrogen, ethylene and the like, and a method in which components are dissolved in or diluted with a solvent and charged in the form of solution or slurry, are usually used.

In the case of conducting prepolymerization by a slurry polymerization method, saturated aliphatic hydrocarbon compounds are usually used as the solvent, and examples thereof include propane, n-butane, isobutane, n-pentane, isopentane, n-hexane, cyclohexane, heptane and the like. These are used singly or in combination of two or more. As the saturated aliphatic hydrocarbon compound, those having a boiling point at normal pressure of 100° C. or less are preferable, those having a boiling point at normal pressure of 90° C. or less are more preferable, and propane, n-butane, isobutane, n-pentane, isopentane, n-hexane and cyclohexane are further preferable.

In the case of conducting prepolymerization by a slurry polymerization method, the slurry concentration is usually 0.1 to 600 g, preferably 0.5 to 300 g, in terms of the amount of the cocatalyst component (B) per liter of a solvent. The prepolymerization temperature is usually −20 to 100° C., preferably 0 to 80° C. During prepolymerization, the polymerization temperature may be changed appropriately. The partial pressure of olefins in a gas phase portion during prepolymerization is usually 0.001 to 2 MPa, preferably 0.01 to 1 MPa. The prepolymerization time is usually 2 minutes to 15 hours.

As the method of feeding the prepolymerized solid catalyst component which has been prepolymerized to a polymerization reaction tank, a method of charging under anhydrous state using an inert gas such as nitrogen, argon and the like, and hydrogen, ethylene and the like, and a method in which components are dissolved in or diluted with a solvent and charged in the form of solution or slurry, are usually used.

The ethylene-α-olefin copolymer of the present invention may be allowed to contain known additives, if necessary. Examples of the additive include an antioxidant, anti-weathering agent, lubricant, anti-blocking agent, anti-static agent, anti-fogging agent, anti-dropping agent, pigment, filler and the like.

The ethylene-α-olefin copolymer of the present invention is molded by known molding methods, for example, extrusion molding methods, hollow molding methods and injection molding methods such as a blown film molding method, flat die film molding method and the like; compression molding methods, and the like. As the molding method, extrusion molding methods and follow molding methods are suitably used, and extrusion molding methods are more suitably used, and a flat die film molding method is particularly suitably used.

The ethylene-α-olefin copolymer of the present invention is molded into various forms and used. The form of a molded article is not particularly restricted, and it is used in the form of a film, sheet, vessel (tray, bottle or the like) and the like. The molded article is suitably used also in applications such as food packaging materials; medical article packaging materials; electronic parts packaging materials used for packaging of semiconductor products and the like; surface protective materials, and the like.

As described above, the ethylene-α-olefin copolymer of the present invention is excellent in extrusion load, swell ratio and mechanical strength in molding processing. Thus, neck-in in molding a flat die film can also be lowered. Further, taking-up property in extrusion molding is also excellent.

The ethylene-α-olefin copolymer of the present invention can also be blended in suitable amount in a conventional ethylenic polymer, for the purpose of improving neck-in of an ethylenic polymer poor in neck-in. For example, neck-in can be significantly improved by blending the ethylene-α-olefin copolymer of the present invention in suitable amount in an ethylenic polymer such as a linear low density polyethylene and the like.

The present invention will be illustrated by examples and comparative examples below.

In the examples and the comparative examples, physical properties were measured according to the following methods.

(1) Density (d, Unit: kg/m$^3$)

The density was measured according to a method defined in method A of JIS K7112-1980. A sample was subjected to annealing described in JIS K6760-1995.

(2) Melt Flow Rate (MFR, Unit: g/10 minutes)

The melt flow rate was measured by method A under conditions of a load of 21.18 N and a temperature of 190° C. according to a method defined in JIS K7210-1995.

(3) Melt Flow Rate Ratio (MFRR)

The melt flow rate (H-MFR) was measured under conditions of a test load of 211.82 N and a measurement temperature of 190° C. in a method defined in JIS K7210-1995 and the melt flow rate (MFR) was measured under conditions of a load of 21.18 N and a temperature of 190° C. in a method defined in JIS K7210-1995, and H-MFR was divided by MFR to give a value of the melt flow rate ratio.

(4) Swell Ratio (SR)

A strand of an ethylene-α-olefin copolymer extruded with a length of about 15 to 20 mm from an orifice under conditions of a temperature of 190° C. and a load of 21.18 N, in measurement of the melt flow rate (2), was cooled in air to obtain a strand in solid state. Then, the diameter D (unit: mm) of the strand was measured at a position about 5 mm from the end at the extrusion upstream side of the strand and the diameter D was divided by the orifice diameter: 2.095 mm ($D_0$), to give a value ($D/D_0$) of the swell ratio.

(5) Molecular Weight Distribution (Mw/Mn, Mz/Mw)

The z average molecular weight (Mz), weight average molecular weight (Mw) and number average molecular weight (Mn) were measured using a gel permeation chromatograph (GPC) method, under the following conditions (1) to (8), and Mw/Mn and Mz/Mw were calculated. The base line on the chromatogram was a straight line obtained by connecting a point in stable horizontal region of sufficiently shorter retention time than emergence of sample elution peak and a point in stable horizontal region of sufficiently longer retention time than observation of solvent elution peak.

(1) Apparatus: Waters 150 C manufactured by Waters
(2) Separation column: TOSOH TSkgel GMH6-HT
(3) Measuring temperature: 140° C.
(4) Carrier: orthodichlorobenzene
(5) Flow rate: 1.0 mL/min
(6) Injection volume: 500 µL (7) Detector: differential refraction (8) Molecular weight reference material: standard polystyrene (6) The Number of Branches having 5 or more Carbon Atoms ($N_{LCB}$, Unit: 1/1000C)

A carbon nuclear magnetic resonance spectrum ($^{13}$C-NMR) was measured by a carbon nuclear magnetic resonance method under the following measurement conditions, and the number of branches was obtained according to the following calculation method.

<Measurement Conditions>
Apparatus: AVANCE600 manufactured by Bruker
Measurement solvent: mixed liquid of 1,2-dichlorobenzene/1,2-dichlorobenzene-d4=75/25 (ratio by volume)
Measurement temperature: 130° C.
Measurement method: proton de-coupling method
Pulse width: 45°
Pulse repetition time: 4 seconds
Measurement standard: trimethylsilane
Window function: negative exponential function <Calculation Method>
The peak area of a peak was measured having a peak top around 38.22 to 38.27 ppm, the sum of all peaks observed in 5 to 50 ppm being 1000. The peak area of the peak was the area of signals in a range from a chemical shift at a valley of a peak adjacent at the higher magnetic field side and a chemical shift at a valley of a peak adjacent at the lower magnetic field side. In measurement of an ethylene-1-octene copolymer under this condition, the position of a top of a peak ascribable to a methine carbon to which a branch having 6 carbon atoms had been connected was 38.21 ppm.

(7) Number of Short Chain Branch ($N_{SCB}$, Unit: 1/1000C)

The number of short chain branches in an ethylene-α-olefin copolymer was measured by an infrared absorption spectrum. The measurement and calculation were carried out utilizing the characteristic absorption derived from an α-olefin, according to a method described in a literature (Die Makromoleculare Chemie, 177, 449 (1976) McRae, M. A., Madams, W. F.). The infrared absorption spectrum was measured using an infrared spectrophotometer (FT-IR7300, manufactured by JASCO Corporation)

(8) g* g* was calculated according to the above-described formula (II).

An ethylene-α-olefin copolymer (100 mg) was dissolved at 135° C. in 100 ml of tetralin containing 0.5% by weight of butylhydroxytoluene (BHT) as a thermal degradation inhibitor to prepare a sample solution, and the relative viscosity (ηrel) of the ethylene-α-olefin copolymer was calculated from the fall time of the above-described sample solution and the fall time of a blank solution composed of tetralin containing only 0.5% by weight of BHT as a thermal degradation inhibitor obtained by using a Ubbelohde type viscometer, and [η] was calculated according to the formula (II-I), and $[\eta]_{GPC}$ was calculated according to the formula (II-II) from measurement of the molecular weight distribution of the ethylene-α-olefin copolymer of the item (5), and $g_{SCB}$* was calculated according to the formula (II-III) from measurement of the number of short chain branches in the ethylene-α-olefin copolymer of the item (7).

(9) Melt Complex Viscosity (η*, Unit: Pa·sec)

A melt complex viscosity-angular frequency curve at 190° C. was measured under the following measurement conditions using a viscoelasticity measurement apparatus (Rheometrics Mechanical Spectrometer RMS-800 manufactured by Rheometrics), and the melt complex viscosity measured at an angular frequency of 100 rad/second was obtained. Lower the melt complex viscosity, more excellent the extrusion load in extrusion molding.

<Measurement Conditions>
geometry: parallel plate
plate diameter: 25 mm
plate interval: 1.5 to 2 mm
strain: 5%
angular frequency: 0.1 to 100 rad/second
measurement atmosphere: nitrogen

(10) Maximum Take-Up Velocity (MTV, Unit: m/min)

Using a melt tension tester manufactured by Toyo Seiki Seisaku-sho Ltd., an ethylene-α-olefin copolymer was melt-extruded from an orifice having a diameter of 2.095 mm and a length of 8 mm at a temperature of 150° C. and an extrusion speed of 0.32 g/min, and the extruded molten ethylene-α-olefin copolymer was taken up in the form of a filament at a take-up rising speed of 6.3 (m/min)/min by a take-up roll. The take-up speed in breaking of the filamentous ethylene-α-olefin copolymer was the maximum take-up velocity. Higher this value, more excellent the taking-up property in extrusion molding.

(11) Impact Strength (Unit: kJ/m$^2$)

The impact strength was measured according to ASTM D1822-68.

(12) Characteristic Relaxation Time (τ, Unit: Second)

Using a viscoelasticity measurement apparatus (Rheometrics Mechanical Spectrometer RMS-800 manufactured by Rheometrics), melt complex viscosity-angular frequency curves at 130° C., 150° C., 170° C. and 190° C. were measured under the following measurement conditions, next, a master curve of the melt complex viscosity-angular frequency curve at 190° C. was made from the resultant melt complex viscosity-angular frequency curves using a calculation software Rhios V.4.4.4 available from Rheometrics, and the characteristic relaxation time (τ) was determined.

<Measurement Conditions>
geometry: parallel plate
plate diameter: 25 mm
plate interval: 1.5 to 2 mm
strain: 5%
angular frequency: 0.1 to 100 rad/second
measurement atmosphere: nitrogen

(13) Flow Activation Energy (Ea, Unit: kJ/mol)

Using a viscoelasticity measurement apparatus (Rheometrics Mechanical Spectrometer RMS-800 manufactured by Rheometrics), melt complex viscosity-angular frequency curves at 130° C., 150° C., 170° C. and 190° C. were measured under the following measurement conditions, next, a master curve of the melt complex viscosity-angular frequency curve at 190° C. was made from the resultant melt complex viscosity-angular frequency curves using a calculation software Rhios V.4.4.4 available from Rheometrics, and the activation energy (Ea) was determined.

<Measurement Conditions>
geometry: parallel plate
plate diameter: 25 mm
plate interval: 1.5 to 2 mm
strain: 5%
angular frequency: 0.1 to 100 rad/second
measurement atmosphere: nitrogen

EXAMPLE 1

(1) Preparation of Solid Catalyst Component

Into a nitrogen-purged reaction vessel equipped with a stirring device was charged 24 kg of toluene and 2.8 kg of silica (Sylopol948 manufactured by Davison; 50% volume average particle size=55 μm; pore volume=1.67 ml/g; specific surface area=325 m²/g) which had been heat-treated at 300° C. under nitrogen flow, and the mixture was stirred. Thereafter, the mixture was cooled to 5° C., then, a mixed solution composed of 0.9 kg of 1,1,1,3,3,3-hexamethyldisilazane and 1.4 kg of toluene was dropped over a period of 30 minutes while keeping the temperature of the reaction vessel at 5° C. After completion of dropping, the mixture was stirred at 5° C. for 1 hour, next, heated up to 95° C., and stirred at 95° C. for 3 hours, and filtrated. The resultant solid product was washed with 20.8 kg of toluene six times. Thereafter, 7.1 kg of toluene was added to give a slurry which was then allowed to stand still overnight.

To the slurry obtained above, 1.73 kg of a hexane solution of diethylzinc (diethylzinc concentration: 50% by weight) and 1.02 kg of hexane were added, and the mixture was stirred. Thereafter, the mixture was cooled to 5° C., then, a mixed solution composed of 0.78 kg of 3,4,5-trifluorophenol and 1.44 kg of toluene was dropped over a period of 60 minutes while keeping the temperature of the reaction vessel at 5° C. After completion of dropping, the mixture was stirred at 5° C. for 1 hour, then, heated up to 40° C. and stirred at 40° C. for 1 hour. Thereafter, the mixture was cooled to 22° C., and 0.11 kg of $H_2O$ was dropped over a period of 1.5 hours while keeping the temperature of the reaction vessel at 22° C. After completion of dropping, the mixture was stirred at 22° C. for 1.5 hours, then, heated up to 40° C. and stirred at 40° C. for 2 hours, and further heated up to 80° C. and stirred at 80° C. for 2 hours. After stirring, the supernatant was extracted to a residual amount of 16 L at room temperature, 11.6 kg of toluene was added, then, the mixture was heated up to 95° C. and stirred for 4 hours. After stirring, the supernatant was extracted at room temperature to obtain a solid product. The resultant solid product was washed with 20.8 kg of toluene four times and with 24 liters of hexane three times. Thereafter, the product was dried to obtain a solid catalyst component.

(2) Preparation of Prepolymerized Catalyst Component

Into a previously nitrogen-purged autoclave equipped with a stirring device having an internal volume of 5 liters was added 835 g of butane, then, the autoclave was heated up to 50° C., and 60 mg of diphenylmethylene(cyclopentadienyl)(9-fluorenyl)zirconium dichloride [corresponding to transition metal compound (A2)] and 0.68 g of racemic-ethylenebis (1-indenyl)zirconium diphenoxide [corresponding to transition metal compound (A1)] were added in the form of a powder, and the mixture was stirred at 50° C. for 75 minutes. Next, 28 g of ethylene was charged, and after stabilization in the system, 10.6 g of the solid catalyst component obtained in Example 1(1) was added, subsequently, 4.2 ml of a heptane solution of triisobutylaluminum having a triisobutylaluminum concentration of 1 mmol/ml was added, and polymerization was initiated. Prepolymerization was carried out at 50° C. for 100 minutes while continuously feeding a mixed gas of ethylene and hydrogen having a hydrogen concentration of 0.2%. After completion of polymerization, ethylene, butane, hydrogen and the like were purged to give a residual solid which was then dried at room temperature, to obtain a prepolymerized catalyst component containing 16.5 g of polyethylene per gram of the solid catalyst component.

(3) Polymerization

An atmosphere in a 5 L autoclave equipped with a stirring device which had been purged with argon after drying under reduced pressure was evacuated, and hydrogen was added so that its partial pressure was 0.051 MPa, and 200 ml of 1-hexene and 1065 g of butane were charged, and the temperature in the system was raised up to 70° C., then, ethylene was introduced so that its partial pressure was 1.6 MPa, to attain stabilization in the system. As a result of gas chromatography, the gas composition in the system contained hydrogen=2.65 mol %. To this was added 1.0 ml of a toluene solution of triethylamine having a triethylamine concentration of 0.1 mmol/ml, then, 2.0 ml of a heptanes solution of triisobutylaluminum having a triisobutylaluminum concentration of 1 mmol/ml was added. Next, 355 mg of the prepolymerized catalyst component obtained in Example 1(2) was added. Polymerization was carried out at 70° C. for 220 minutes while continuously feeding an ethylene/hydrogen mixed gas (hydrogen=0.49 mol %) so that the total pressure and the hydrogen concentration in the gas were maintained constant during polymerization. Thereafter, butane, ethylene and hydrogen were purged, to obtain 117 g of an ethylene-1-hexene copolymer. The physical properties of the resultant copolymer are shown in Table 1.

EXAMPLE 2

(1) Polymerization

An atmosphere in an autoclave equipped with a stirring device having an internal volume of 3 liters which had been purged with argon after drying under reduced pressure was evacuated, and hydrogen was added so that its partial pressure was 0.03 MPa, and 180 ml of 1-hexene and 650 g of butane as a polymerization solvent were charged, and the temperature was raised up to 70° C. Then, ethylene was added so that its partial pressure was 1.6 MPa, to attain stabilization in the system. As a result of gas chromatography analysis, the gas composition in the system contained hydrogen=1.84 mol %. To this was added 0.9 ml of a hexane solution of triisobutylaluminum having a concentration adjusted to 1 mol/l as the organoaluminum compound (C). Next, 0.5 ml of a toluene solution of racemic-ethylenebis(1-indenyl)zirconium diphenoxide [corresponding to transition metal compound (A1)] having a concentration adjusted to 2 μmol/ml and 0.8 ml of a toluene solution of diphenylmethylene(cyclopentadienyl)(9-fluorenyl)zirconium dichloride [corresponding to transition metal compound (A2)] having a concentration adjusted to 0.1 μmol/ml were added, subsequently, 38.7 mg of the solid catalyst component obtained in Example 1(1) described above was added. Polymerization was carried out at 70° C. for 60 minutes while continuously feeding an ethylene/hydrogen mixed gas (hydrogen=0.25 mol %) so that the total pressure and the hydrogen concentration in the gas were maintained constant during polymerization. Thereafter, butane, ethylene and hydrogen were purged, to obtain 182 g of an ethylene-1-hexene copolymer. The physical properties of the resultant copolymer are shown in Table 1.

EXAMPLE 3

(1) Polymerization

An atmosphere in an autoclave equipped with a stirring device having an internal volume of 3 liters which had been purged with argon after drying under reduced pressure was evacuated, and hydrogen was added so that its partial pressure was 0.04 MPa, and 200 ml of 1-hexene and 650 g of butane as a polymerization solvent were charged, and the temperature was raised up to 70° C. Then, ethylene was added so that its partial pressure was 1.6 MPa, to attain stabilization in the system. As a result of gas chromatography analysis, the gas composition in the system contained hydrogen=2.21 mol %. To this was added 0.9 ml of a hexane solution of triisobutylaluminum having a concentration adjusted to 1 mol/l as the organoaluminum compound (C). Next, 0.3 ml of a toluene solution of racemic-ethylenebis(1-indenyl)zirconium diphenoxide [corresponding to transition metal compound (A1)] having a concentration adjusted to 2 μmol/ml and 0.5 ml of a toluene solution of diphenylmethylene(cyclopentadienyl)(9-fluorenyl)zirconium dichloride [corresponding to transition metal compound (A2)] having a concentration adjusted to 0.1 μmol/ml were added, subsequently, 16.4 mg of the solid catalyst component obtained in Example 1(1) described above was added. Polymerization was carried out at 70° C. for 60 minutes while continuously feeding an ethylene/hydrogen mixed gas (hydrogen=0.25 mol %) so that the total pressure and the hydrogen concentration in the gas were maintained constant during polymerization. Thereafter, butane, ethylene and hydrogen were purged, to obtain 101 g of an ethylene-1-hexene copolymer. The physical properties of the resultant copolymer are shown in Table 1.

EXAMPLE 4

(1) Polymerization

An atmosphere in an autoclave equipped with a stirring device having an internal volume of 3 liters which had been purged with argon after drying under reduced pressure was evacuated, and hydrogen was added so that its partial pressure was 0.04 MPa, and 180 ml of 1-hexene and 650 g of butane as a polymerization solvent were charged, and the temperature was raised up to 70° C. Then, ethylene was added so that its partial pressure was 1.6 MPa, to attain stabilization in the system. As a result of gas chromatography analysis, the gas composition in the system contained hydrogen=2.12 mol %. To this was added 0.9 ml of a hexane solution of triisobutylaluminum having a concentration adjusted to 1 mol/l as the organoaluminum compound (C). Next, 0.5 ml of a toluene solution of racemic-ethylenebis(1-indenyl)zirconium diphenoxide [corresponding to transition metal compound (A1)] having a concentration adjusted to 2 μmol/ml and 0.8 ml of a toluene solution of diphenylmethylene(cyclopentadienyl)(9-fluorenyl)zirconium dichloride [corresponding to transition metal compound (A2)] having a concentration adjusted to 0.1 μmol/ml were added, subsequently, 29.2 mg of the solid catalyst component obtained in Example 1(1) described above was added. Polymerization was carried out at 70° C. for 60 minutes while continuously feeding an ethylene/hydrogen mixed gas (hydrogen=0.27 mol %) so that the total pressure and the hydrogen concentration in the gas were maintained constant during polymerization. Thereafter, butane, ethylene and hydrogen were purged, to obtain 189 g of an ethylene-1-hexene copolymer. The physical properties of the resultant copolymer are shown in Table 1.

EXAMPLE 5

(1) Polymerization

An atmosphere in an autoclave equipped with a stirring device having an internal volume of 3 liters which had been purged with argon after drying under reduced pressure was evacuated, and hydrogen was added so that its partial pressure was 0.04 MPa, and 160 ml of 1-hexene and 650 g of butane as a polymerization solvent were charged, and the temperature was raised up to 70° C. Then, ethylene was added so that its partial pressure was 1.6 MPa, to attain stabilization in the system. As a result of gas chromatography analysis, the gas composition in the system contained hydrogen=2.52 mol %. To this was added 0.9 ml of a hexane solution of triisobutylaluminum having a concentration adjusted to 1 mol/l as the organoaluminum compound (C). Next, 0.5 ml of a toluene solution of racemic-ethylenebis(1-indenyl)zirconium diphenoxide [corresponding to transition metal compound (A1)] having a concentration adjusted to 2 μmol/ml and 0.8 ml of a toluene solution of diphenylmethylene(cyclopentadienyl)(9-fluorenyl)zirconium dichloride [corresponding to transition metal compound (A2)] having a concentration adjusted to 0.1 μmol/ml were added, subsequently, 20.6 mg of the solid catalyst component obtained in Example 1(1) described above was added. Polymerization was carried out at 70° C. for 60 minutes while continuously feeding an ethylene/hydrogen mixed gas (hydrogen=0.25 mol %) so that the total pressure and the hydrogen concentration in the gas were maintained constant during polymerization. Thereafter, butane, ethylene and hydrogen were purged, to obtain 135 g of an ethylene-1-hexene copolymer. The physical properties of the resultant copolymer are shown in Table 1.

EXAMPLE 6

(1) Polymerization

An atmosphere in an autoclave equipped with a stirring device having an internal volume of 3 liters which had been purged with argon after drying under reduced pressure was evacuated, and hydrogen was added so that its partial pressure was 0.06 MPa, and 180 ml of 1-hexene and 650 g of butane as a polymerization solvent were charged, and the temperature was raised up to 70° C. Then, ethylene was added so that its partial pressure was 1.6 MPa, to attain stabilization in the system. As a result of gas chromatography analysis, the gas composition in the system contained hydrogen=3.56 mol %. To this was added 0.9 ml of a hexane solution of triisobutylaluminum having a concentration adjusted to 1 mol/l as the organoaluminum compound (C). Next, 0.5 ml of a toluene solution of racemic-ethylenebis(1-indenyl)zirconium diphenoxide [corresponding to transition metal compound (A1)] having a concentration adjusted to 2 μmol/ml and 0.8 ml of a toluene solution of diphenylmethylene(cyclopentadienyl)(9-fluorenyl)zirconium dichloride [corresponding to transition metal compound (A2)] having a concentration adjusted to 0.1 μmol/ml were added, subsequently, 23.1 mg of the solid catalyst component obtained in Example 1(1) described above was added. Polymerization was carried out at 70° C. for 60 minutes while continuously feeding an ethylene/hydrogen mixed gas (hydrogen=0.29 mol %) so that the total pressure and the hydrogen concentration in the gas were maintained constant during polymerization. Thereafter, butane, ethylene and hydrogen were purged, to obtain 118 g of an ethylene-1-hexene copolymer. The physical properties of the resultant copolymer are shown in Table 1.

EXAMPLE 7

(1) Polymerization

An atmosphere in an autoclave equipped with a stirring device having an internal volume of 3 liters which had been purged with argon after drying under reduced pressure was evacuated, and hydrogen was added so that its partial pressure was 0.08 MPa, and 180 ml of 1-hexene and 650 g of butane as a polymerization solvent were charged, and the temperature was raised up to 70° C. Then, ethylene was added so that its partial pressure was 1.6 MPa, to attain stabilization in the system. As a result of gas chromatography analysis, the gas composition in the system contained hydrogen=4.99 mol %. To this was added 0.9 ml of a hexane solution of triisobutylaluminum having a concentration adjusted to 1 mol/l as the organoaluminum compound (C). Next, 0.3 ml of a toluene solution of racemic-ethylenebis(1-indenyl)zirconium diphenoxide [corresponding to transition metal compound (A1)] having a concentration adjusted to 2 μmol/ml and 0.3 ml of a toluene solution of diphenylmethylene(cyclopentadienyl)(9-fluorenyl)zirconium dichloride [corresponding to transition metal compound (A2)] having a concentration adjusted to 1 μmol/ml were added, subsequently, 31.8 mg of the solid catalyst component obtained in Example 1(1) described above was added. Polymerization was carried out at 70° C. for 60 minutes while continuously feeding an ethylene/hydrogen mixed gas (hydrogen=0.31 mol %) so that the total pressure and the hydrogen concentration in the gas were maintained constant during polymerization. Thereafter, butane, ethylene and hydrogen were purged, to obtain 97.1 g of an ethylene-1-hexene copolymer. The physical properties of the resultant copolymer are shown in Table 1.

EXAMPLE 8

(1) Polymerization

An atmosphere in an autoclave equipped with a stirring device having an internal volume of 3 liters which had been purged with argon after drying under reduced pressure was evacuated, and hydrogen was added so that its partial pressure was 0.04 MPa, and 180 ml of 1-hexene and 650 g of butane as a polymerization solvent were charged, and the temperature was raised up to 70° C. Then, ethylene was added so that its partial pressure was 1.6 MPa, to attain stabilization in the system. As a result of gas chromatography analysis, the gas composition in the system contained hydrogen=2.41 mol %. To this was added 0.9 ml of a hexane solution of triisobutylaluminum having a concentration adjusted to 1 mol/l as the organoaluminum compound (C). Next, 0.45 ml of a toluene solution of racemic-ethylenebis(1-indenyl)zirconium diphenoxide [corresponding to transition metal compound (A1)] having a concentration adjusted to 2 μmol/ml and 0.3 ml of a toluene solution of diphenylmethylene(cyclopentadienyl)(9-fluorenyl)zirconium dichloride [corresponding to transition metal compound (A2)] having a concentration adjusted to 0.1 μmol/ml were added, subsequently, 9.9 mg of the solid catalyst component obtained in Example 1(1) described above was added. Polymerization was carried out at 70° C. for 60 minutes while continuously feeding an ethylene/hydrogen mixed gas (hydrogen=0.25 mol %) so that the total pressure and the hydrogen concentration in the gas were maintained constant during polymerization. Thereafter, butane, ethylene and hydrogen were purged, to obtain 124.4 g of an ethylene-1-hexene copolymer. The physical properties of the resultant copolymer are shown in Table 1.

EXAMPLE 9

(1) Preparation of Prepolymerized Catalyst Component

Into a previously nitrogen-purged autoclave equipped with a stirring device having an internal volume of 5 liters was added 833 g of butane, then, the autoclave was heated up to 50° C., then, 28 g of ethylene was charged, to attain stabilization in the system. Next, separately in a 50 ml flask, 57 mg of diphenylmethylene(cyclopentadienyl)(9-fluorenyl)zirconium dichloride [corresponding to transition metal compound (A2)], 0.67 g of racemic-ethylenebis(1-indenyl)zirconium diphenoxide [corresponding to transition metal compound (A1)], and 4.1 ml of a hexane solution of triisobutylaluminum having a triisobutylaluminum concentration of 1 mmol/ml as the organoaluminum compound (C) were mixed and stirred to mix at 50° C. for 4 hours under a nitrogen atmosphere, and the resultant solution was placed in an autoclave. Subsequently, 10.4 g of the solid catalyst component prepared in Example 1 was added, and polymerization was initiated. Prepolymerization was carried out at 50° C. for 80 minutes while continuously feeding a mixed gas of ethylene and hydrogen having a hydrogen concentration of 0.2%. After completion of polymerization, ethylene, butane, hydrogen and the like were purged to give a residual solid which was then dried at room temperature, to obtain a prepolymerized catalyst component containing 17.5 g of polyethylene per gram of the solid catalyst component.

(2) Polymerization

An atmosphere in an autoclave equipped with a stirring device having an internal volume of 3 liters which had been purged with argon after drying under reduced pressure was evacuated, and hydrogen was added so that its partial pressure was 0.035 MPa, and 180 ml of 1-hexene and 650 g of butane were charged, and the temperature in the system raised up to 70° C., then, ethylene was added so that its partial pressure was 1.6 MPa, to attain stabilization in the system. As a result of gas chromatography, the gas composition in the system contained hydrogen=2.15 mol %. To this was added 0.9 ml of a hexane solution of triisobutylaluminum having a triisobutylaluminum concentration of 1 mmol/ml as the organoaluminum compound (C). Next, 363 mg of the prepolymerized catalyst component obtained in Example 9(1) was added. Polymerization was carried out at 70° C. for 60 minutes while continuously feeding an ethylene/hydrogen mixed gas (hydrogen=0.24 mol %) so that the total pressure and the hydrogen concentration in the gas were maintained constant during polymerization. Thereafter, butane, ethylene and hydrogen were purged, to obtain 128 g of an ethylene-1-hexene copolymer. The physical properties of the resultant copolymer are shown in Table 1.

EXAMPLE 10

(1) Polymerization

An atmosphere in an autoclave equipped with a stirring device having an internal volume of 3 liters which had been purged with argon after drying under reduced pressure was evacuated, and hydrogen was added so that its partial pressure was 0.028 MPa, and 55 g of 1-butene and 695 g of butane as a polymerization solvent were charged, and the temperature was raised up to 70° C. Then, ethylene was added so that its partial pressure was 1.6 MPa, to attain stabilization in the system. As a result of gas chromatography analysis, the gas composition in the system contained hydrogen=1.34 mol % and 1-butene=2.31 mol %. To this was added 0.9 ml of a hexane solution of triisobutylaluminum having a concentration adjusted to 1 mol/l as the organoaluminum compound (C). Next, 0.5 ml of a toluene solution of racemic-ethylenebis (1-indenyl)zirconium diphenoxide [corresponding to transition metal compound (A1)] having a concentration adjusted to 2 μmol/ml and 1 ml of a toluene solution of diphenylmethylene(cyclopentadienyl)(9-fluorenyl)zirconium dichloride [corresponding to transition metal compound (A2)] having a concentration adjusted to 0.1 μmol/ml were added, subsequently, 10.1 mg of the solid catalyst component obtained in Example 1(1) described above was added. Polymerization was carried out at 70° C. for 60 minutes while continuously feeding an ethylene/hydrogen mixed gas (hydrogen=0.38 mol %) so that the total pressure and the hydrogen concentration in the gas were maintained constant during polymerization. Thereafter, butane, ethylene and hydrogen were purged, to obtain 105 g of an ethylene-1-butene copolymer. The physical properties of the resultant copolymer are shown in Table 1.

EXAMPLE 11

(1) Polymerization

An atmosphere in an autoclave equipped with a stirring device having an internal volume of 3 liters which had been purged with argon after drying under reduced pressure was evacuated, and hydrogen was added so that its partial pressure was 0.058 MPa, and 45 g of 1-butene and 705 g of butane as a polymerization solvent were charged, and the temperature was raised up to 70° C. Then, ethylene was added so that its partial pressure was 1.6 MPa, to attain stabilization in the system. As a result of gas chromatography analysis, the gas composition in the system contained hydrogen=3.21 mol % and 1-butene=2.82 mol %. To this was added 0.9 ml of a hexane solution of triisobutylaluminum having a concentration adjusted to 1 mol/l as the organoaluminum compound (C). Next, 0.5 ml of a toluene solution of racemic-dimethylsilylenebis(1-indenyl)zirconium dichloride [corresponding to transition metal compound (A1)] having a concentration adjusted to 2 μmol/ml and 1.0 ml of a toluene solution of diphenylmethylene(cyclopentadienyl)(9-fluorenyl)zirconium dichloride [corresponding to transition metal compound (A2)] having a concentration adjusted to 0.1 μmol/ml were added, subsequently, 8.9 mg of the solid catalyst component obtained in Example 1(1) described above was added. Polymerization was carried out at 70° C. for 60 minutes while continuously feeding an ethylene/hydrogen mixed gas (hydrogen=0.77 mol %) so that the total pressure and the hydrogen concentration in the gas were maintained constant during polymerization. Thereafter, butane, ethylene and hydrogen were purged, to obtain 85 g of an ethylene-1-butene copolymer. The physical properties of the resultant copolymer are shown in Table 1.

EXAMPLE 12

(1) Polymerization

An atmosphere in an autoclave equipped with a stirring device having an internal volume of 3 liters which had been purged with argon after drying under reduced pressure was evacuated, and hydrogen was added so that its partial pressure was 0.03 MPa, and 120 ml of 1-hexene and 650 g of butane were charged, and the temperature in the system was raised up to 70° C., then, ethylene was added so that its partial pressure was 1.0 MPa, to attain stabilization in the system. As a result of gas chromatography, the gas composition in the system contained hydrogen=2.37 mol %. To this was added 0.9 ml of a hexane solution of triisobutylaluminum having a triisobutylaluminum concentration of 1 mmol/ml as the organoaluminum compound (C). Next, 289 mg of the prepolymerized catalyst component obtained in Example 9(1) described above was added. Polymerization was carried out at 70° C. for 120 minutes while continuously feeding an ethylene/hydrogen mixed gas (hydrogen=0.24 mol %) so that the total pressure and the hydrogen concentration in the gas were maintained constant during polymerization. Thereafter, butane, ethylene and hydrogen were purged, to obtain 79 g of an ethylene-1-hexene copolymer. The physical properties of the resultant copolymer are shown in Table 1.

EXAMPLE 13

(1) Preparation of Prepolymerized Catalyst Component

Into a previously nitrogen-purged autoclave equipped with a stirring device having an internal volume of 5 liters was added 836 g of butane, then, the autoclave was heated up to 50° C., then, 28 g of ethylene was charged, to attain stabilization in the system. Next, separately in a 50 ml flask, 0.25 g of diphenylmethylene(cyclopentadienyl)(9-fluorenyl)zirconium dichloride [corresponding to transition metal compound (A2)], 0.52 g of racemic-ethylenebis(1-indenyl)zirconium diphenoxide [corresponding to transition metal compound (A1)], and 4.3 ml of a hexane solution of triisobutylaluminum having a triisobutylaluminum concentration of 1 mmol/ml were mixed and stirred to mix at 50° C. for 4 hours under a nitrogen atmosphere, and the resultant solution was placed in an autoclave. Then, further, 10.3 g of the solid catalyst component obtained in Example 1(1) was added, and polymerization was initiated. Prepolymerization was carried out at 50° C. for 100 minutes while continuously feeding a mixed gas of ethylene and hydrogen having a hydrogen concentration of 0.2%. After completion of polymerization, ethylene, butane, hydrogen and the like were purged to give a residual solid which was then dried at room temperature, to obtain a prepolymerized catalyst component containing 15.9 g of polyethylene per gram of the solid catalyst component.

(2) Polymerization

An atmosphere in an autoclave equipped with a stirring device having an internal volume of 3 liters which had been purged with argon after drying under reduced pressure was evacuated, and hydrogen was added so that its partial pressure was 0.08 MPa, and 180 ml of 1-hexene and 650 g of butane were charged, and the temperature in the system raised up to 70° C., then, ethylene was added so that its partial pressure was 1.6 MPa, to attain stabilization in the system. As a result of gas chromatography, the gas composition in the system contained hydrogen=4.73 mol %. To this was added 0.9 ml of a hexane solution of triisobutylaluminum having a triisobutylaluminum concentration of 1 mmol/ml as the organoaluminum compound (C). Next, 333 mg of the prepolymerized catalyst component obtained in Example 13(1) described above was added. Polymerization was carried out at 70° C. for 120 minutes while continuously feeding an ethylene/hydrogen mixed gas (hydrogen=0.33 mol %) so that the total pressure and the hydrogen concentration in the gas were maintained constant during polymerization. Thereafter, butane, ethylene and hydrogen were purged, to obtain 78 g of an ethylene-1-hexene copolymer. The physical properties of the resultant copolymer are shown in Table 1.

COMPARATIVE EXAMPLE 1

(1) Polymerization

An atmosphere in an autoclave equipped with a stirring device having an internal volume of 3 liters which had been purged with argon after drying under reduced pressure was evacuated, and hydrogen was added so that its partial pressure was 0.065 MPa, and 50 g of 1-butene and 700 g of butane as a polymerization solvent were charged, and the temperature was raised up to 70° C. Then, ethylene was added so that its partial pressure was 1.6 MPa, to attain stabilization in the system. As a result of gas chromatography analysis, the gas composition in the system contained hydrogen=3.69 mol % and 1-butene=2.09 mol %. To this was added 0.9 ml of a hexane solution of triisobutylaluminum having a concentration adjusted to 1 mmol/ml as the organoaluminum compound (C). Next, 0.5 ml of a toluene solution of racemic-ethylenebis(1-indenyl)zirconium diphenoxide [corresponding to transition metal compound (A1)] having a concentration adjusted to 2 µmol/ml and 0.5 ml of a toluene solution of diphenylmethylene(cyclopentadienyl)(9-fluorenyl)zirconium dichloride [corresponding to transition metal compound (A2)] having a concentration adjusted to 2 µmol/ml were added, subsequently, 21.8 mg of the solid catalyst component obtained in Example 1(1) described above was added. Polymerization was carried out at 70° C. for 60 minutes while continuously feeding an ethylene/hydrogen mixed gas (hydrogen=0.58 mol %) so that the total pressure and the hydrogen concentration in the gas were maintained constant during polymerization. Thereafter, butane, ethylene and hydrogen were purged, to obtain 85 g of an ethylene-1-butene copolymer. The physical properties of the resultant copolymer are shown in Table 1.

COMPARATIVE EXAMPLE 2

(1) Polymerization

An atmosphere in an autoclave equipped with a stirring device having an internal volume of 3 liters which had been purged with argon after drying under reduced pressure was evacuated, and hydrogen was added so that its partial pressure was 0.08 MPa, and 55 g of 1-butene and 695 g of butane as a polymerization solvent were charged, and the temperature was raised up to 70° C. Then, ethylene was added so that its partial pressure was 1.6 MPa, to attain stabilization in the system. As a result of gas chromatography analysis, the gas composition in the system contained hydrogen=3.68 mol % and 1-butene=2.22 mol %. To this was added 0.9 ml of a hexane solution of triisobutylaluminum having a concentration adjusted to 1 mol/l as the organoaluminum compound (C). Next, 0.5 ml of a toluene solution of racemic-ethylenebis (1-indenyl)zirconium diphenoxide [corresponding to transition metal compound (A1)] having a concentration adjusted to 2 µmol/ml and 1.0 ml of a toluene solution of diphenylmethylene(cyclopentadienyl)(9-fluorenyl)zirconium dichloride [corresponding to transition metal compound (A2)] having a concentration adjusted to 2 µmol/ml were added, subsequently, 31.3 mg of the solid catalyst component obtained in Example 1(1) described above was added. Polymerization was carried out at 70° C. for 60 minutes while continuously feeding an ethylene/hydrogen mixed gas (hydrogen=0.80 mol %) so that the total pressure and the hydrogen concentration in the gas were maintained constant during polymerization. Thereafter, butane, ethylene and hydrogen were purged, to obtain 121 g of an ethylene-1-butene copolymer. The physical properties of the resultant copolymer are shown in Table 1.

COMPARATIVE EXAMPLE 3

(1) Production of Modified Particle

Into a nitrogen-purged 5 L four-necked flask was charged 2 liters of tetrahydrofuran and 1.35 liters (2.7 mol) of a hexane solution (2M) of diethylzinc, and the mixture was cooled to −50° C. Into this, a solution prepared by dissolving 251.5 g (1.37 mol) of pentafluorophenol in 390 ml of tetrahydrofuran was dropped over a period of 25 minutes. After completion of dropping, the temperature was gradually raised up to room temperature, and the mixture was stirred for 3 hours. Thereafter, the mixture was heated at 45° C. and stirred for 1 hour. The temperature was lowered down to 20° C. with an ice bath, and 37.72 g (2.09 mol) of $H_2O$ was dropped over a period of 1.4 hours. As a result, the mixture was separated into a yellow transparent liquid substance and a yellow gelled substance. After completion of dropping, the mixture was stirred for 2 hours, heated up to 40° C., then, further stirred for 1 hour. The mixture was allowed to stand still overnight at room temperature, then, 72% by weight of the yellow transparent liquid substance and the total amount of the yellow gelled substance were separated into separate flasks which had been purged with nitrogen, and volatile components were distilled off respectively, and dried at 120° C. for 8 hours under reduced pressure. Thereafter, a solid derived from the yellow transparent liquid substance was dissolved in 3 liters of tetrahydrofuran, and this was transferred into a 5 L flask containing a solid derived from the yellow gelled substance. This was allowed to stand still for 69 hours at room temperature, then, dried under reduced pressure at 120° C. for 8 hours. As a result, 374 g of a solid product was obtained.

Into a nitrogen-purged 5 L four-necked flask was charged 374 g of the above-described solid product and 3 liters of tetrahydrofuran, and the mixture was stirred. To this was added 282 g of silica (Sylopol948 manufactured by Davison; average particle size=61 µm; pore volume=1.61 ml/g; specific surface area=296 $m^2$/g) which had been heat-treated at 300° C. under nitrogen flow. The mixture was heated at 40° C. and stirred for 2 hours, then, a solid component was allowed to deposit, and a slurry portion of the upper layer was removed. As a washing operation, to this was added 3 liters of tetrahydrofuran and the mixture was stirred, then, a solid component was allowed to deposit, and a slurry portion of the upper layer was removed. The above-described washing operation was repeated five times in total. After removing a liquid component by a grass filter, drying was carried out at 120° C. for 8 hours under reduced pressure, to obtain 452 g of modified particles.

(2) Polymerization

An atmosphere in an autoclave equipped with a stirring device having an internal volume of 3 liters which had been purged with argon after drying under reduced pressure was evacuated, and hydrogen was added so that its partial pressure was 0.001 MPa, and 680 g of butane and 70 g of 1-butene were charged, and the temperature was raised up to 70° C. Then, ethylene was added so that its partial pressure was 1.6 MPa, to attain stabilization in the system. As a result of gas chromatography analysis, the gas composition in the system contained hydrogen=0.04 mol % and 1-butene=3.21 mol %. To this was added 0.9 ml of a heptane solution of triisobutylaluminum having a concentration adjusted to 1 mmol/ml as the organoaluminum compound (C). Next, 7.9 ml of a mixed toluene solution containing three transition metal compounds having a racemic-ethylenebis(1-indenyl)hafnium dichloride concentration adjusted to 0.84 µmol/ml, a racemic-ethylenebis(1-indenyl)zirconium dichloride concentration adjusted to 0.06 µmol/ml and a bis(n-butylcyclopentadienyl) zirconium dichloride concentration adjusted to 0.25 µmol/ml was added, subsequently, 14.0 mg of the modified particles obtained in Comparative Example 4(1) described above were added as the solid catalyst component. Polymerization was carried out at 70° C. for 60 minutes while feeding a mixed gas of ethylene and hydrogen containing 0.09 mol % of hydrogen so as the keep the total pressure constant. As a result, 98 g of an ethylene-1-butene copolymer was obtained. The physical properties of the resultant copolymer are shown in Table 1.

TABLE 1

|  |  | Example 1 | Example 2 | Example 3 | Example 4 | Example 5 | Example 6 |
|---|---|---|---|---|---|---|---|
| density | kg/m³ | 929 | 918 | 918 | 920 | 922 | 922 |
| MFR | g/10 min | 1.9 | 1.03 | 3.2 | 5.0 | 6.8 | 16.8 |
| SR | — | — | 1.91 | 2.0 | 2.04 | 2.23 | 2.13 | 2.20 |
| molecular weight distribution |  |  |  |  |  |  |  |
| Mw/Mn | — | 10.7 | 5.2 | 6.0 | 5.5 | 6.4 | 6.3 |
| Mz/Mw |  | 3.5 | 3.4 | 3.0 | 3.5 | 3.0 | 3.0 |
| $N_{LCB}$ | 1/1000C | 0.15 | 0.14 | 0.16 | 0.09 | 0.18 | 0.02 |
| $N_{SCB}$ | 1/1000C | 12.7 | 17.6 | 18.3 | 17.4 | 16.0 | 17.6 |
| $[\eta]$ |  | 0.99 | 1.09 | 1.00 | 0.96 | 0.92 | 0.8 |
| g* | — | 0.791 | 0.866 | 0.897 | 0.877 | 0.884 | 0.906 |
| melt complex viscosity | Pa · sec | 469 | 703 | 527 | 420 | 379 | 201 |
| Maximum take-up velocity | m/min | 9 | 2.1 | 9.1 | 18.2 | 32.1 | 107.1 |
| impact strength | kJ/m² | 241 | 1121 | 830 | 1288 | 968 | 596 |
| characteristic relaxation time | second | 4.93 | 5.84 | 1.77 | 1.71 | 0.95 | 0.03 |
| flow activation energy | kJ/mol | 74 | 74 | 62 | 63 | 58 | 52 |

|  |  | Example 7 | Example 8 | Example 9 | Example 10 | Example 11 | Example 12 |
|---|---|---|---|---|---|---|---|
| density | kg/m³ | 919 | 920 | 921 | 924 | 921 | 918 |
| MFR | g/10 min | 6.4 | 9.12 | 5.07 | 1.80 | 5.67 | 5.26 |
| SR | — | 2.17 | 1.97 | 2.37 | 1.99 | 1.87 | 2.49 |
| molecular weight distribution |  |  |  |  |  |  |  |
| Mw/Mn | — | 9.7 | 4.6 | 7.5 | 6.0 | 4.7 | 9.2 |
| Mz/Mw |  | 4.2 | 2.7 | 3.9 | 3.4 | 3.0 | 4.2 |
| $N_{LCB}$ | 1/1000C | 0.04 | 0.09 | 0.06 | 0.11 | 0.06 | 0.06 |
| $N_{SCB}$ | 1/1000C | 20.6 | 17.7 | 17.7 | 15.9 | 16.6 | 19.8 |
| $[\eta]$ |  | 0.94 | 0.91 | 0.91 | 1.09 | 1.0 | 0.96 |
| g* | — | 0.934 | 0.888 | 0.83 | 0.795 | 0.831 | 0.903 |
| melt complex viscosity | Pa · sec | 345 | 345 | 394 | 658 | 448 | 361 |
| Maximum take-up velocity | m/min | 11.7 | 193.5 | 7.1 | 1.8 | 68.3 | 2.7 |
| impact strength | kJ/m² | 289 | 653 | 513 | 114 | 133 | 663 |
| characteristic relaxation time | second | 7.43 | 0.46 | 2.49 | 5.3 | 2.3 | 3.2 |
| flow activation energy | kJ/mol | 109 | 62 | 69 | 73 | 65 | 70 |

|  |  | Example 13 | Comparative Example 1 | Comparative Example 2 | Comparative Example 3 |
|---|---|---|---|---|---|
| density | kg/m³ | 917 | 924 | 923 | — |
| MFR | g/10 min | 3.54 | 2.8 | 1.93 | 1.09 |
| SR | — | 2.04 | 2.25 | 2.0 | 2.12 |
| molecular weight distribution |  |  |  |  |  |
| Mw/Mn | — | 13.3 | 10.9 | 12.4 | 4.5 |
| Mz/Mw |  | 4.4 | 4.4 | 4.1 | 3.8 |
| $N_{LCB}$ | 1/1000C | 0.05 | 0.10 | 0.09 | — |
| $N_{SCB}$ | 1/1000C | 21.1 | 18.6 | 19.0 | 13.9 |
| $[\eta]$ |  | 1.02 | 1.06 | 1.11 | 1.31 |
| g* | — | 0.903 | 0.843 | 0.857 | 0.854 |
| melt complex viscosity | Pa · sec | 385 | 408 | 490 | 919 |
| Maximum take-up velocity | m/min | 8.5 | 2.3 | 3.4 | — |
| impact strength | kJ/m² | 779 | 128 | — | — |
| characteristic relaxation time | seconds | 7.7 | 24.44 | 61.46 | 31.8 |
| flow activation energy | kJ/mol | 70 | 73 | 31 | 65 |

INDUSTRIAL APPLICABILITY

The present invention is capable of providing an ethylene-α-olefin copolymer excellent in extrusion load, swell ratio and mechanical strength, and showing sufficiently short relaxation time of a molecular chain in molten state, and a molded article obtained by extrusion molding of the copolymer.

The invention claimed is:

1. An ethylene-α-olefin copolymer wherein the copolymer has a monomer unit based on ethylene and a monomer unit based on an α-olefin having 3 to 20 carbon atoms, the density (d) is 860 to 950 kg/m$^3$, the melt flow rate (MFR) is 1 to 100 g/10 min, the ratio (Mw/Mn) of the weight average molecular weight (Mw) to the number average molecular weight (Mn) is 4 to 30, the ratio (Mz/Mw) of the Z average molecular weight (Mz) to the weight average molecular weight (Mw) is 3.4 to 5, the swell ratio (SR) is 1.8 or more, and the characteristic relaxation time (τ) obtained by linear viscoelasticity measurement is 0.01 to 10 seconds.

2. The ethylene-α-olefin copolymer according to claim 1, wherein the number of branches having 5 or more carbon atoms measured by $^{13}$C-NMR ($N_{LCB}$) is 0.1 or more per 1000 carbon atoms.

3. A molded article obtained by extrusion molding of the ethylene-α-olefin copolymer according to claim 1.

4. A molded article obtained by extrusion molding of the ethylene-α-olefin copolymer according to claim 2.

* * * * *